United States Patent [19]

Miyamoto et al.

[11] Patent Number: 5,272,267
[45] Date of Patent: Dec. 21, 1993

[54] ASYMMETRIC DIOXAZINE COMPOUNDS HAVING A TRIAZINYL BRIDGING GROUP AND A METHOD OF PRODUCTION AND USE THEREOF

[75] Inventors: Tetsuya Miyamoto, Takatsuki; Naoki Harada, Suita, both of Japan

[73] Assignee: Sumitomo Chemical Company, Limited, Osaka, Japan

[21] Appl. No.: 914,637

[22] Filed: Jul. 17, 1992

Related U.S. Application Data

[63] Continuation of Ser. No. 467,991, Jan. 22, 1990, abandoned.

[30] Foreign Application Priority Data

| Feb. 1, 1989 | [JP] | Japan | 1-024409 |
| Feb. 7, 1989 | [JP] | Japan | 1-029518 |
| Feb. 7, 1989 | [JP] | Japan | 1-029519 |
| Feb. 7, 1989 | [JP] | Japan | 1-029520 |
| Nov. 1, 1989 | [JP] | Japan | 1-287130 |

[51] Int. Cl.$^5$ ............... C09B 62/503; C09B 62/04; D06P 1/38
[52] U.S. Cl. ............... 544/76; 544/77
[58] Field of Search ............... 544/76, 77

[56] References Cited

U.S. PATENT DOCUMENTS

| 4,604,459 | 8/1986 | Jaeger | 544/76 |
| 4,841,049 | 6/1989 | Seitz | 544/76 |
| 4,933,446 | 6/1990 | Sawamoto et al. | 544/76 |

FOREIGN PATENT DOCUMENTS

| 0074928 | 3/1983 | European Pat. Off. |
| 0076782 | 4/1983 | European Pat. Off. |

*Primary Examiner*—Mary C. Lee
*Assistant Examiner*—Fiona T. Powers
*Attorney, Agent, or Firm*—Stevens, Davis, Miller & Mosher

[57] ABSTRACT

An asymmetric dioxazine compound of the following formula in the free acid form,

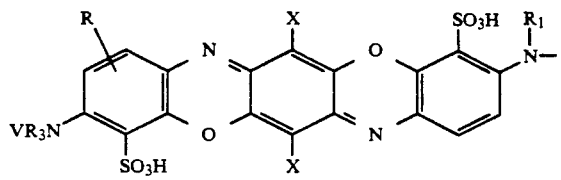

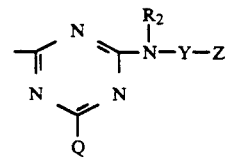

wherein R is hydrogen, halogen, sulfo or alkoxy, $R_1$, $R_2$ and $R_3$ are each hydrogen or alkyl, $X_1$ and $X_2$ are each hydrogen, halogen, alkyl, alkoxy or phenoxy, Y is alkylene, phenylene or naphthylene, Z is $-SO_2CH=CH_2$, $-SO_2CH_2CH_2OSO_3H$ or the like, V is hydrogen, alkyl, acyl or substituted triazinyl, and Q is halogen, alkoxy, amino or a group similar to that of

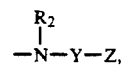

provided that R is hydrogen, and Q is amino or a group similar to that of

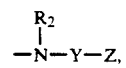

when V is substituted triazinyl, which is useful for dyeing or printing fiber materials to give dyed or printed products of a brilliant blue color superior in fastness properties, particularly those such as chlorine fastness with superior build-up property.

19 Claims, No Drawings

ASYMMETRIC DIOXAZINE COMPOUNDS HAVING A TRIAZINYL BRIDGING GROUP AND A METHOD OF PRODUCTION AND USE THEREOF

This application is a continuation of application Ser. No. 07/467,991, filed Jan. 22, 1990, now abandoned.

The present invention relates to fiber reactive asymmetric dioxazine compounds, their production and their use as fiber reactive dyes. More specifically, the present invention relates to fiber reactive asymmetric dioxazine compounds useful for dyeing or printing hydroxyl or amide group-containing materials, particularly cellulose fibers, natural or synthetic polyamide or polyurethane fibers, leathers or their mixed fibers to produce dyed or printed products having superior fastness properties such as light fastness, wet fastness and chlorine fastness.

Fiber reactive dioxazine compounds useful for dyeing or printing such materials are known as disclosed in, for example, Published Unexamined Japanese Patent Application Nos. 57-14654, 61-14265, 63-75066 and 63-170463.

However, these known dioxazine compounds are not satisfactory in their dye performance in properties such as, level dyeing property, build-up property and dyeing velocity as well as fastness properties such as chlorine fastness, and they still require improvement in such dye performance. Of these problems, the fastness Properties of the or printed hydroxyl or amide group-containing materials, particularly those such as chlorine fastness of the dyed or printed hydroxyl group-containing materials, are particularly significant.

The present inventors have undertaken extensive studies to solve such problems and have found that a specific asymmetric dioxazine compound can meet such needs.

The present invention provides a dioxazine compound represented by the following formula (I) in the free acid form,

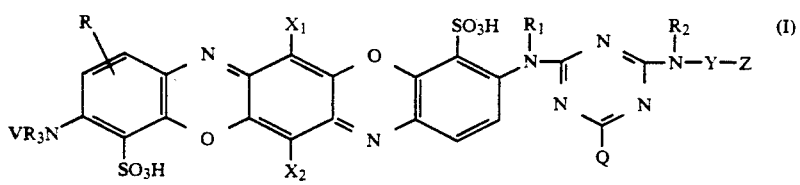

wherein R is hydrogen, halogen, sulfo or alkoxy, $R_1$, $R_2$ and $R_3$ independently of one another are each hydrogen or unsubstituted or substituted alkyl, $X_1$ and $X_2$ independently of one another are each hydrogen, halogen, alkyl, alkoxy or phenoxy, Y is unsubstituted or substituted alkylene, phenylene or naphthylene, Z is $-SO_2CH=CH_2$ or $-SO_2CH_2CH_2Z'$ in which Z' is a group capable of being split by the action of an alkali, V is hydrogen, unsubstituted or substituted alkyl, an acyl group of the formula (1), $-W-R_4$ (1) in which W is carbonyl or sulfonyl, and $R_4$ is unsubstituted or substituted alkyl or phenyl, or a triazinyl group of the formula (2),

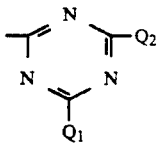

(2) in which $Q_1$ and $Q_2$ independently of one another are each unsubstituted or substituted amino, and Q is halogen, alkoxy, unsubstituted or substituted amino or a group of the formula (3),

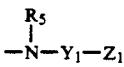

(3) in which $R_5$ is hydrogen or unsubstituted or substituted alkyl, $Y_1$ is unsubstituted or substituted alkylene, phenylene or naphthylene, and $Z_1$ is $-SO_2CH=CH_2$ or $-SO_2CH_2CH_2$ Z'' in which Z'' is a group capable of being split by the action of an alkali, with the proviso that R is hydrogen and Q is unsubstituted or substituted amino as defined above or a group of the formula (3), when V is a triazinyl group of the formula (2).

The present invention also provides a process for producing the dioxazine compound represented by the formula (I), which comprises subjected 2,4,6-trihalogeno-s-triazine to condensation reactions with an intermediate dioxazine compound represented by the following formula (II) in the free acid form,

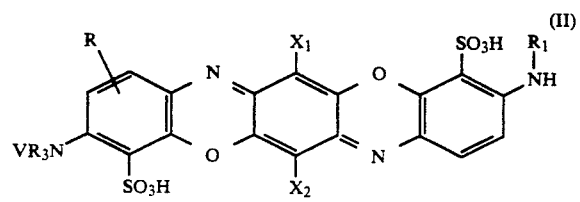

wherein R, $R_1$, $R_3$, V, $X_1$ and $X_2$ are as defined above, an amine compound represented by the following formula (III),

wherein $R_2$, Y and Z are as defined above, and optionally a compound represented by the following formula (IV),

wherein Q' has the same meanings as Q except for halogen.

The present invention further provides a process for dyeing or printing hydroxyl or amide group-containing materials, which comprises using the dioxazine compound represented by the formula (I).

The dioxazine compound of the formula (I) in accordance with the present invention includes those having the following formulas (I-1), (I-2), (I-3) and (I-4) in the free acid form;

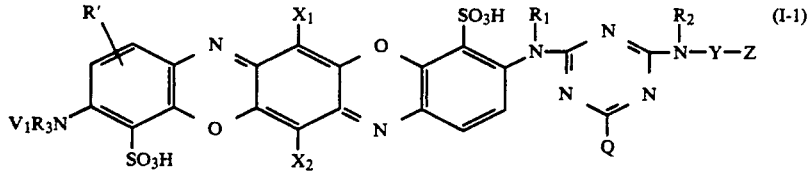

wherein R' is halogen, sulfo or alkoxy, $V_1$ is hydrogen, unsubstituted or substituted alkyl or an acyl group of the formula (1), and $R_1$, $R_2$, $R_3$, $X_1$, $X_2$, Y, Z and Q are as defined above,

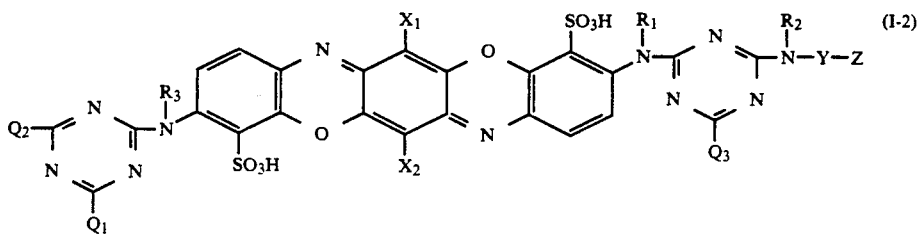

wherein $Q_3$ is unsubstituted or substituted amino or a group of the formula (3), and $R_1$, $R_2$, $R_3$, $X_1$, $X_2$, Y, Z, $Q_1$ and $Q_2$ are as defined above,

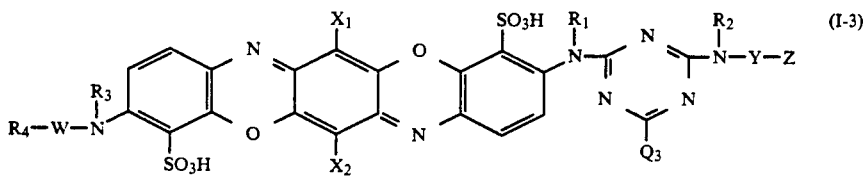

wherein $R_1$, $R_2$, $R_3$, $R_4$, W, $X_1$, $X_2$, Y, Z and $Q_3$ are as defined above, and

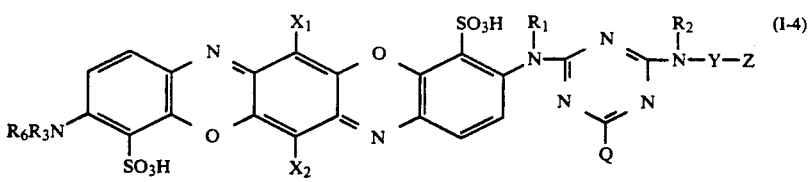

wherein $R_6$ is hydrogen or unsubstituted or substituted alkyl, and $R_1$, $R_2$, $R_3$, $X_1$, $X_2$, Y, Z and Q are as defined above.

With respect to the symbol R, in the above formulas, the halogen includes fluorine, chlorine and the like, and the alkoxy includes $C_1$ to $C_4$ alkoxy such as methoxy, ethoxy and the like.

With respect to the symbols $R_1$, $R_2$, $R_3$, $R_5$ and $R_6$, the alkyl is preferably one having 1 to 4 carbon atoms, which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl. $R_1$, $R_2$, $R_3$, $R_5$ and $R_6$ preferably are hydrogen, methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, ethylcarbonyloxymethyl, ethylcarbonyloxymethyl, 2-methylcarbonyloxyethyl, 2-ethylcarbonyloxyethyl, 3-methylcarbonoyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these $R_1$ is most preferably hydrogen.

With respect to the symbol $R_4$, the group of —W—$R_4$ stands for an acyl group including alkyl-, alkenyl- or phenyl-carbonyl groups such as acetyl, propionyl, benzoyl and the like, and alkyl-, alkenyl- or phenyl-sulfonyl groups such as methanesulfonyl, p-toluenesulfonyl and the like. The alkyl, alkenyl and phenyl in the acyl group can be substituted by carboxy or sulfo. Such substituted acyl groups include, for example, carboxyethylcarbonyl, carboxyvinylcarbonyl, o-, m- or p-carboxyphenylcarbonyl, o-, m- or p-sulfophenylcarbonyl and o-, m- or p-sulfophenylsulfonyl.

With respect to the symbols $X_1$ and $X_2$, the halogen includes chlorine, bromine and the like, the alkyl and alkoxy includes those having 1 to 4 carbon atoms such as methyl, ethyl and the like, and methoxy, ethoxy and the like, respectively. Of those represented by $X_1$ and $X_2$, chlorine and bromine are particularly preferred. With respect to the symbols Y and $Y_1$, the alkylene includes $-(CH_2)_2-$, $-(CH_2)_3-$, $-(CH_2)_2O-(CH_2)_2-$ and the like. The phenylene can be unsubstituted or substituted once or twice by methyl, ethyl, methoxy, ethoxy, chlorine, bromine, nitro, carboxy or sulfo, and the naphthylene can be unsubstituted or substituted once by sulfo. Examples thereof are:

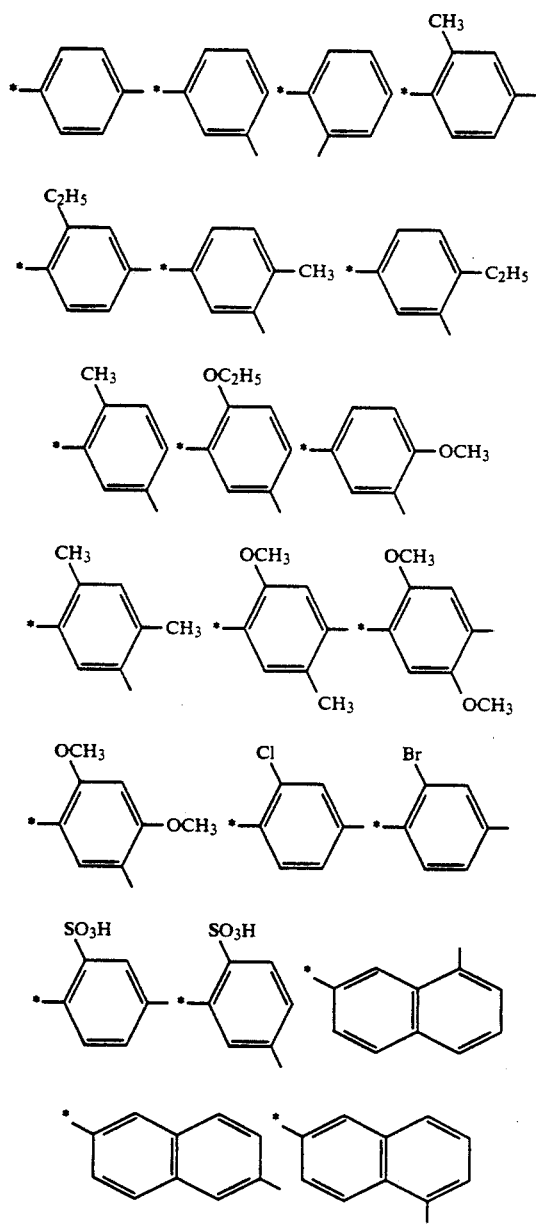

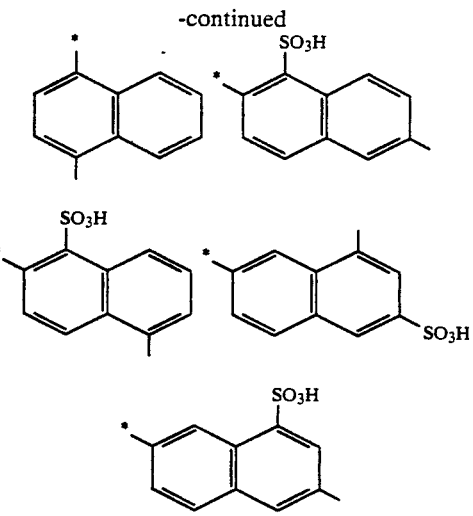

In the above formulas, the linkage marked with* bonds to the group

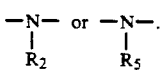

With respect to the symbols Z' and Z", the group capable of being split by the action of an alkali is well known in this art and includes, for example, sulfuric acid ester, thiosulfuric acid ester, phosphoric acid ester, acetic acid ester and other ester groups, and halogen atoms. Among the groups represented by Z and $Z_1$, particularly preferred are $-SO_2CH=CH_2$ and $-SO_2CH_2CH_2OSO_3H$.

With respect to the symbol Q, the halogen includes fluorine, chlorine and bromine. Of these, preferred are fluorine and chlorine. The alkoxy includes, for example, methoxy, ethoxy and the like The unsubstituted or substituted amino which is also represented by $Q_1$, $Q_2$ and $Q_3$ includes amino, alkylamino, N,N-dialkylamino, cycloalkylamino, aralkylamino, arylamino and N,N-disubstituted amino such as N,N-dialkylamino, N-alkyl-N-cycloalkyl and N-alkyl-N-arylamino, as well as a heterocyclic ring-containing amino which heterocyclic ring may be further addition-condensed with a homocyclic ring and N-heterocyclic ring-constituting amino which may contain additional hetero atoms (in the present invention, the term "N-heterocyclic ring-constituting amino" is intended to mean that the nitrogen atom of the amino is a member forming a heterocyclic ring).

In the above definition with respect to the amino, the alkyl is straight or branched one preferably having 1 to 4 carbon atoms, and preferable examples of the cycloalkyl, aralkyl and aryl are cyclohexyl, benzyl, phenethyl, phenyl and naphthyl, respectively. Examples of the heterocyclic ring are furan, thiophene, pyrazole, pyridine, pirimidine, quinoline, benzimidazole, benzthiazole and benzoxazole. The N-heterocyclic ring-constituting amino is preferably a six-membered ring which may contain additional hetero atoms such as nitrogen, oxygen and sulphur. The above-mentioned alkyl, cycloalkyl, aralkyl, aryl, heterocyclic ring and N-heterocyclic ring may be unsubstituted or substituted by halogen, nitro, cyano, trifluoromethyl, sulfamoyl, carbamoyl, $C_1$ to $C_4$ alkyl, $C_1$ to $C_4$ alkoxy, acylamino, ureido, hydroxyl, carboxy, sulfomethyl and sulfo.

Preferable examples of the amino represented by Q are —NH2, methylamino, hydroxymethylamino, ethylamino, propylamino, butylamino, hexylamino, β-methoxyethylamino, β-ethoxyethylamino, γ-methoxypropylamino, N,N-dimethylamino, N,N-di-hydroxymethylamino, N,N-diethylamino, β-chloroethylamino, β-cyanoethylamino, N,N-di-β-hydroxyethylamino, β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- or 4-sulfoanilino, 2,4- or 2,5-disulfoanilino, sulfomethylanilino, N-sulfomethylanilino, 3- or 4-carboxyphenylamino, 2-carboxy-5-sulfophenylamino, 2-carboxyl-4-sulfophenylamino, 2-methoxy-5-sulfophenylamino, 2-methyl-5-sulfophenylamino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, 4,8-disulfonaphthyl-(2)-amino, 3,6,8-trisulfonaphthyl-(2)-amino, 4,6,8-trisulfonaphthyl-(2)-amino, pyridyl-(2)-amino, morpholino, piperidino, piperazino, N-β-hydroxyethyl-N-methylamino, N-ethyl-N-hydroxymethylamino, carboxymethyl amino, β-carboxyethylamino, β-sulfoethylamino, N-(β-sulfoethyl)-N-methylamino, and the like.

Among the dioxazine compounds in accordance with the present invention, preferred embodiments are those having sulfo as R' in the aforesaid formula (I-1), those having hydrogen as both $R_1$ and $R_3$ in the formulas (I-2) and (I-3), and those having sulfoalkyl as $R_6$ in the formula (I-4).

The dioxazine compound of the formula (I) may be in the form of a free acid or a salt of an alkali metal or alkaline earth metal. Of these metal salts, preferred are sodium, potassium and lithium salts.

The dioxazine compound of the formula (I) can be produced in the following manner.

The intermediate dioxazine compound of the formula (II), the amine of the formula (III) with or without the compound of the formula (IV) can be subjected to condensation reactions in any order with a 1,3,5-trihalogeno-s-triazine, thereby obtaining the desired dioxazine compound of the formula (I).

Although any of the condensation reactions can be carried out under optional reaction conditions and the order of the condensation reactions is not limited, the first condensation can be preferably carried out at a temperature of −10° to 40° C. and at a pH ranging from 2 to 9, the second condensation at a temperature of 0° to 70° C. and at a pH ranging from 2 to 9, and the third condensation if any at a temperature of 10° to 100° C. and at a pH ranging from 2 to 7. The order of the condensation reactions is preferably in such a manner that the compound having the lowest reactivity to the 1,3,5-trihalogeno-s-triazine is subjected to the first condensation reaction.

The intermediate dioxazine compound of the formula (II) can be prepared in a conventional manner, for example, as follows.

A 1,4-benzoquinone represented by the following formula (V),

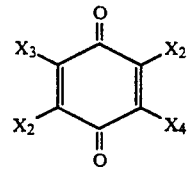

wherein $X_1$ and $X_2$ are as defined above, and $X_3$ and $X_4$ are each halogen, can be subjected to a condensation reaction with a diaminobenzene represented by the following formula (VI) in the free acid form,

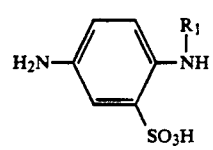

wherein $R_1$ is as defined above, and a sulfodiaminobenzene represented by the following formula (VII) in the free acid form,

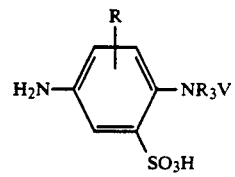

wherein R, $R_3$ and V are as defined above, thereby obtaining a dianilide compound represented by the following formula (VIII) in the free acid form,

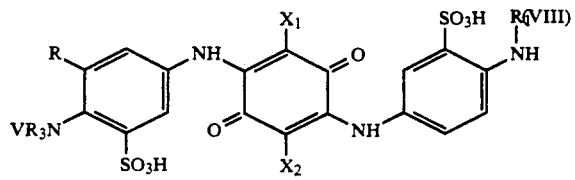

wherein R, $R_1$, $R_3$, V, $X_1$ and $X_2$ are as defined above. Successively, the dianilide compound can be subjected to a cyclization reaction, if necessary in the presence of an oxidizing agent, thereby obtaining the desired intermediate dioxazine compound (II).

In the above manner, the diaminobenzene (VI) may be replaced by another diaminobenzene represented by the following formula (IX) in the free acid form,

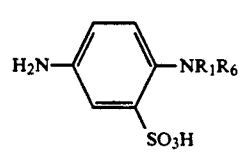

wherein $R_1$ is as defined above, and $R_6$ is alkyl such as methyl, ethyl and propyl, to obtain a dianilide represented by the following formula (X) in the free acid form,

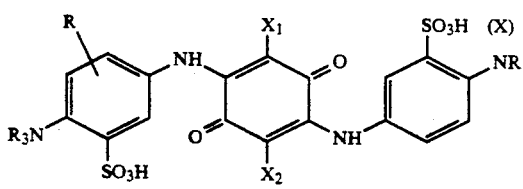

wherein R, $R_1$, $R_3$, $R_6$, V, $X_1$ and $X_2$ are as defined above. The dianilide can be simultaneously subjected to cyclization and dealkylation, if desired in the presence of an oxidizing agent, thereby obtaining the desired intermediate dioxazine compound (II).

In the case where the desired intermediate dioxazine compound (II) has unsubstituted or substituted alkyl groups as both $R_3$ and V, it can be prepared also by alkylating the dianilide (VIII) or the intermediate dioxazine compound (II) which have been obtained using the sulfodiaminobenzene of the formula (VII) wherein both $R_3$ and V are hydrogen atoms.

In the case where the desired intermediate dioxazine compound (II) has sulfo as R, or the acyl group of the formula (I) as V it can also be prepared by sulfonating or acylating the intermediate dioxazine compound (II) having hydrogen as R or V, respectively.

In the present invention, when at least one of $R_3$ and V is unsubstituted or substituted alkyl, or V is the acyl group (1), such dioxazine compound of the formula (I) can also be produced by alkylating or acylating the intermediate dioxazine compound (II) having hydrogen as at least one of $R_3$ and V, or V, respectively.

In addition, the dioxazine compound represented by the formula (I-2) can also be produced by subjecting a 2,4,6-trihalogeno-s-triazine to condensation reactions with an intermediate dioxazine compound which is represented by a formula corresponding to the formula (I), provided that V is hydrogen and Q is replaced by $Q_3$, and which can be prepared in any manner described above, and the respective amine compounds of the formulas H-$Q_1$ and H-$Q_2$ wherein $Q_1$ and $Q_2$ are as defined above, in an optional order. In the case where $Q_2$ is the same as $Q_3$ in their meanings, such dioxazine compound can also be produced by reacting an intermediate tioxazine compound which is represented by a formula corresponding to the formula (I-2), provided that $Q_2$ and $Q_3$ are each halogen, and which can be prepared in any manner described above, with two molar amounts of an amine compound represented by H-$Q_3$ in which $Q_3$ is as defined above.

Further, the dioxazine compound of the formula (I-3) can also be produced in the following manner. A 2,4,6-trihalogeno-s-triazine can be subjected to condensation reactions with the intermediate dioxazine compound (II) wherein V is hydrogen, the amine (III) and the amine compound of the formula H-$Q_3$ in which $Q_3$ is as defined above, in any order. In a course of the above condensation reaction, intermediate dioxazine compounds represented by the following formulas (II-1), (II-2), (II-3) and (II-4) in their free acid forms,

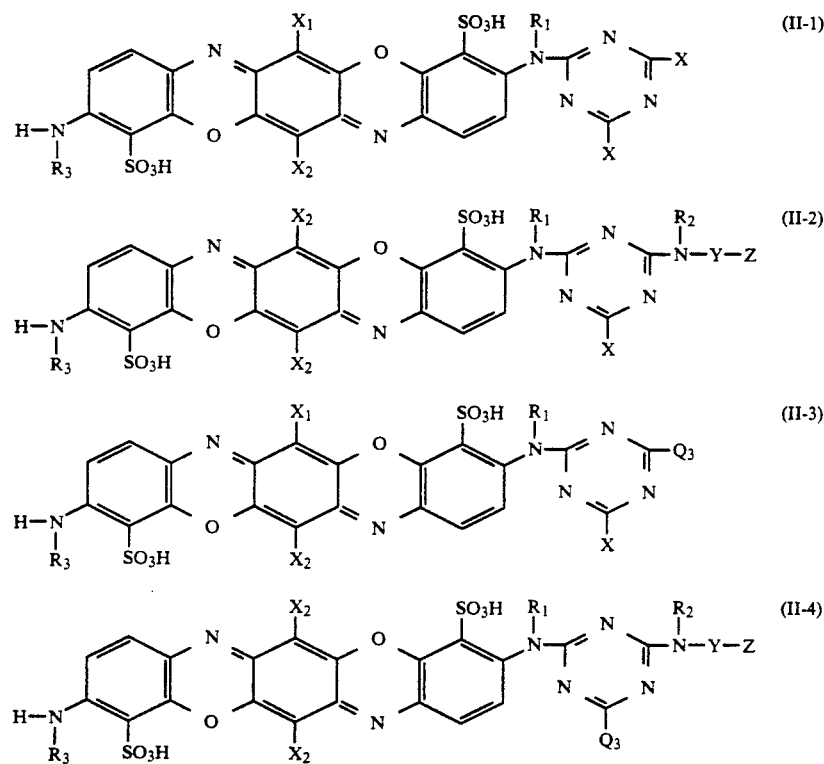

wherein X is halogen, $X_1$, $X_2$, $R_1$, $R_2$, $R_3$, $Q_3$, Y and Z are as defined above, can be obtained. Successively, the intermediate dioxazine compounds can be subjected to acylation in a conventional manner, and the resulting compounds corresponding to the formulas (II-1), (II-2) and (II-3) can be further subjected to a condensation reaction with the remaining amine or amines, whereby the desired dioxazine compound of the formula (I-3) can be produced.

The dioxazine compound (I) in accordance with the present invention is fiber-reactive and useful for dyeing or printing hydroxyl group-containing and amide group-containing materials. The materials are preferably in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing or prior thereto. Alternatively the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogen carobnate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and making the bath neutral, or in some cases alkaline, to perform the fixation. The dyeing temperature ranges usually from 60° to 120° C. In order to achieve a level dyeing, there may be used a conventional level dyeing agent such as a condensation product of cyanuric chloride and 3 times by mole of aminobenzenesulfonic acid or aminonaphthalenesulfonic acid, or an addition product of stearylamine and ethylene oxide, and the like.

The present dioxazine compound (I) can be characterized by excellent dye performances in the dyeing and printing of fiber materials, particularly cellulose fiber materials. For example, the compound can give a dyed or printed product excellent in light fastness, perspiration-light fastness, wet fastness such as washing resistance, peroxide-washing resistance, perspiration resistance and acid-hydrolysis resistance, and alkali fastness, chlorine fastness, abrasion fastness and iron fastness.

The dioxazine compound (I) can also exhibit excellent build-up, level-dyeing and wash off properties and high solubility as well as high exhaustion and fixation percentages. Moreover, the dioxazine compound (I) is hardly affected by changes in dyeing temperature and dyeing bath ratio, so that a dyed product with a constant quality can be obtained with superior reproducibility.

Moreover, the dioxazine compound (I) is characterized in properties such it is hard to change the quality of compound even when brought into contact with a basic substance during storage, and products dyed or printed with the compound (I) are hard to change in their color even when they are subjected to fix treatment or resin-finishing.

The present invention is illustrated in more detail with reference to the following Examples, which are only illustrative, and in which parts and % are by weight.

EXAMPLE 1

1,4-Phenylenediamine-2,6-disulfonic acid (26.8 parts) and 1,4-phenylenediamine-2-sulfonic acid (18.8 parts) were dissolved in water (500 parts), and chloranil (24.6 parts) was added thereto. The mixture was adjusted to a pH from 4 to 8 at ambient temperature and stirred to complete the reaction. Thereafter, the reaction mixture was salted out, and the crystals produced were isolated and dried to obtain a dianilide represented by the following formula in the free acid form.

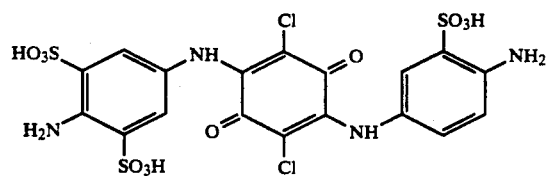

The dianilide (62.9 parts) was added to oleum of 10 to 30% strength (1500 parts) at a temperature of 0° to 15° C., and the mixture was stirred at 15° to 40° C. to complete the reaction. The reaction mixture was poured into ice water to produce crystals, which were then separated by filtration. The cake was mixed with water, and the mixture was adjusted to a pH ranging from 3 to 6 using an aqueous sodium hydroxide solution and salted out using sodium chloride. The crystals were isolated on a filter to obtain a first intermediate dioxazine compound represented by the following formula in the free acid form.

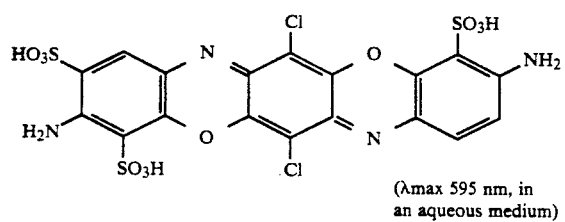

(λmax 595 nm, in an aqueous medium)

The intermediate dioxazine compound (62.5 parts) was dissolved in water (1500 parts), and cyanuric chloride (18.5 parts) was added thereto at a temperature of 5° to 30° C. The mixture was stirred to complete the reaction, while controlling the pH within a range of 2 to 7 using an aqueous sodium carbonate solution. Sulfanilic acid (17.3 parts) was added thereto, and the mixture was stirred at 30° to 50° C. within the pH range of 2 to 7. The reaction mixture was salted out using sodium chloride, and the crystals were separated to obtain a second intermediate dioxazine compound represented by the following formula in the free acid form.

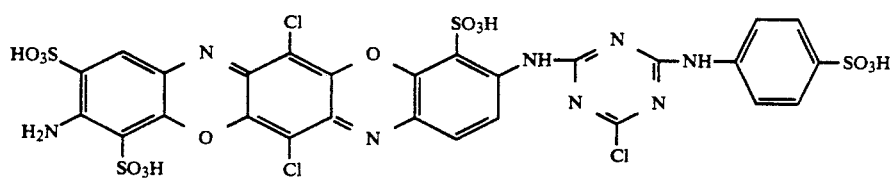

(λmax 580 nm)

The above intermediate dioxazine compound (909.8 parts) was dissolved in water, and 1-aminobenzene-3-β-sulfatoethylsulfone (28.1 parts) was added thereto. The mixture was heated to 50° to 70° C., while controlling the pH within a range of 2 to 5, and stirring was continued under the conditions described above to complete the reaction. Potassium chloride was added to the reaction mixture which was allowed to cool at ambient temperature, and the crystals produced were separated on a filter to obtain an asymmetric dioxazine compound represented by the following formula in the free acid form.

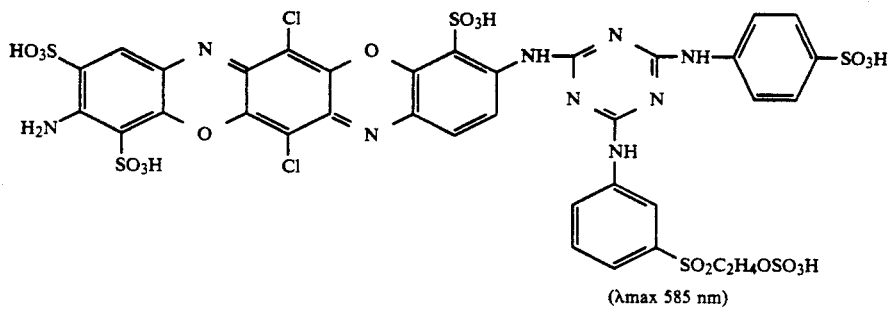

(λmax 585 nm)

EXAMPLE 2

Example 1 was repeated, except that bromanil was used in place of chloranil in an equimolar amount, thereby obtaining a dianilide, first and second intermediate dioxazine compounds and finally a desired asymmetric dioxazine compound in this order, the anilide having the following formula in the free acid form,

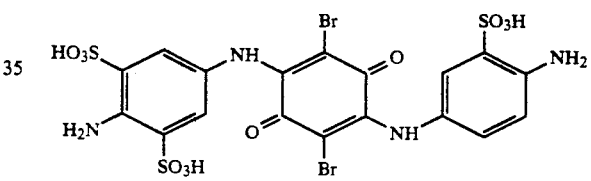

the first intermediate dioxazine compound having the following formula in the free acid form,

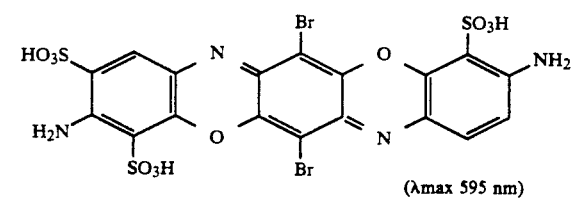

(λmax 595 nm)

the second intermediate dioxazine compound having the following formula,

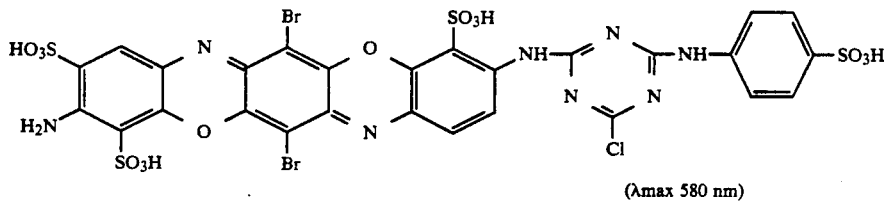

(λmax 580 nm)

and the asymmetric dioxazine compound having the following formula in the free acid form.

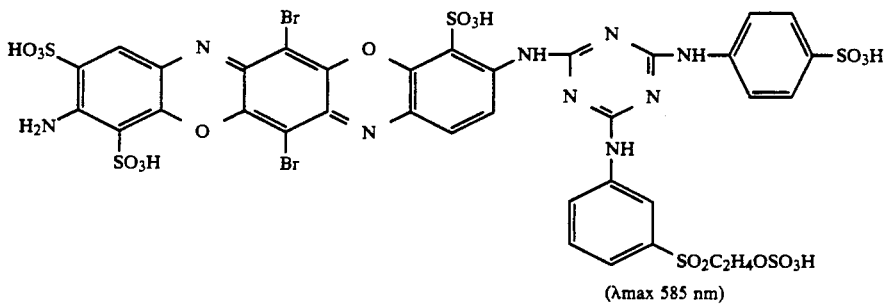

(λmax 585 nm)

DYEING EXAMPLE 1

The asymmetric dioxazine compounds obtained in Examples 1 and 2 (each of 0.1, 0.3 and 0.6 parts) were dissolved in water (200 parts) to prepare each dye bath. Sodium sulfate (10 parts) and cotton (10 parts) were added to the baths, which were then heated to 60° C. Sodium carbonate (4 parts) was added thereto, and dyeing was continued for 1 hour at 60° C. Thereafter, the cotton taken out was washed with water, soaped, again washed with water and then dried to obtain each dyed product of a blue color superior in fastness properties, particularly those such as chlorine fastness. The build-up properties were also found to be superior.

EXAMPLES 3 TO 50

Example 1 was repeated, except that the 1,4-phenylenediamine-2,6-disulfonic acid used in Example 1 was replaced by a phenylenediamine as shown in the following table to obtain a corresponding first intermediate dioxazine compound as shown in the table, and the 1-aminobenzene-3-β-sulfatoethylsulfone used in Example 1 was replaced by an amine compound also as shown in the table, thereby obtaining a corresponding asymmetric dioxazine compound. The color obtained by dyeing cotton in a manner similar to that of Dyeing Example 1 using each asymmetric dioxazine compound is as shown in the following table.

TABLE

| Example No. | Phenylene-diamine | First intermediate dioxazine compound | Amine compound | Color |
|---|---|---|---|---|
| 3 | (2,4-diamino-benzene-1,5-disulfonic acid structure: H₂N–C₆H₂(SO₃H)₂–NH₂) | (dioxazine with two Cl, two SO₃H, two NH₂ substituted phenyl rings) | 4-aminophenyl-SO₂C₂H₄OSO₃H | Reddish blue |
| 4 | " | " | 4-amino-2-(SO₂C₂H₄OSO₃H)-anisole (OCH₃, H₂N, SO₂C₂H₄OSO₃H) | " |
| 5 | " | " | 6-amino-naphthalene with HO₃SOC₂H₄SO₂ | " |
| 6 | " | " | (OCH₃, H₂N, SO₂C₂H₄OSO₃H on benzene) | " |
| 7 | (same phenylenediamine) | (dioxazine with two Cl, two SO₃H, two NH₂ substituted phenyl rings) | (SO₃H, H₂N, SO₂C₂H₄OSO₃H on benzene) | Reddish blue |
| 8 | " | " | (naphthalene with SO₃H, H₂N, SO₂C₂H₄OSO₃H) | " |

TABLE-continued

| Example No. | Phenylene-diamine | First intermediate dioxazine compound | Amine compound | Color |
|---|---|---|---|---|
| 9 | " | " | 4-(N-ethyl-N-(2-sulfatoethylsulfonyl))aminobenzene (C₂H₅HN–C₆H₄–SO₂C₂H₄OSO₃H, para) | " |
| 10 | " | " | 3-(N-ethyl-N-(2-sulfatoethylsulfonyl))aminobenzene (C₂H₅HN–C₆H₄–SO₂C₂H₄OSO₃H, meta) | " |
| 11 | " | " | 2-amino-1-(2-sulfatoethylsulfonyl)-4-sulfobenzene (H₂N–C₆H₃(SO₃H)–SO₂CH₂CH₂OSO₃H) | " |
| 12 | 2-amino-1,3-disulfo-5-aminobenzene (H₂N–C₆H₂(SO₃H)₂–NH₂) | [dioxazine structure: dichloro-dioxazine with two substituted aminobenzene rings bearing SO₃H, NH₂, and HO₃S, H₂N groups] | 3-amino-1-(vinylsulfonyl)benzene (H₂N–C₆H₄–SO₂CH=CH₂, meta) | Reddish blue |
| 13 | " | " | 4-amino-1-(2-acetoxyethylsulfonyl)benzene (H₂N–C₆H₄–SO₂C₂H₄OCOCH₃, para) | " |
| 14 | " | " | 4-amino-1-(2-phosphatoethylsulfonyl)benzene (H₂N–C₆H₄–SO₂C₂H₄OPO₃H₂, para) | " |
| 15 | " | " | 2-amino-8-sulfo-5-(vinylsulfonyl)naphthalene (H₂N, SO₃H, SO₂CH=CH₂ substituted naphthalene) | " |

TABLE-continued
| Example No. | Phenylene-diamine | First intermediate dioxazine compound | Amine compound | Color |
|---|---|---|---|---|
| 16 | 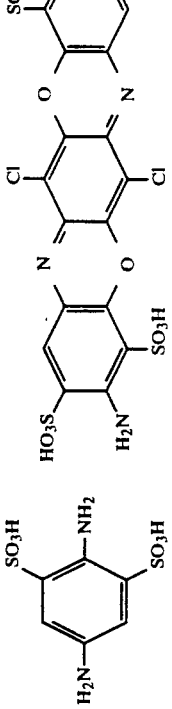 | 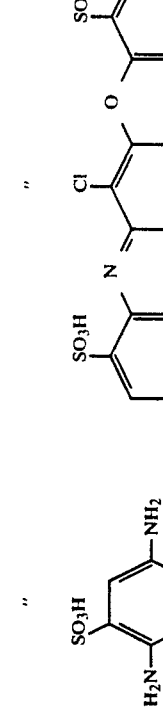 | $H_2N-(CH_2)_2OC_2H_4SO_2C_2H_4-Cl$ | " |
| 17 | " | " | $H_2N-(CH_2)_2OC_2H_4SO_2CH=CH_2$ | Reddish blue |
| 18 | 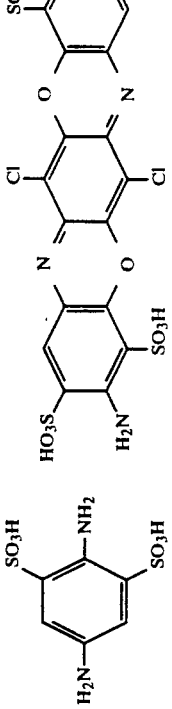 | 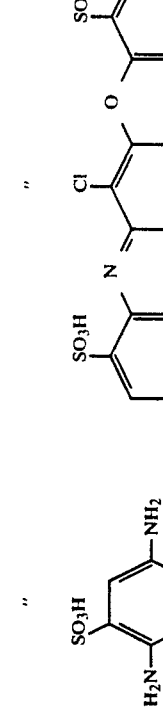 | $H_2N-(CH_2)_2OC_2H_4SO_2CH=CH_2$ | Reddish blue |
| 19 | " | " |  | " |
| 20 | " | " | 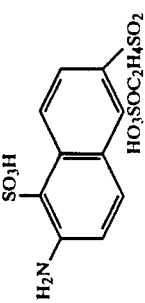 | " |
| 21 | " | " | 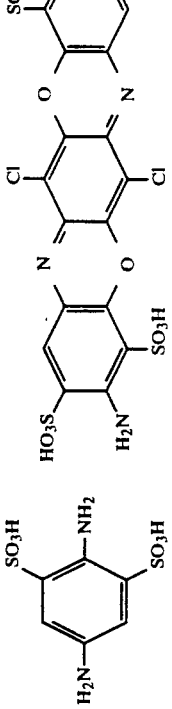 | " |
| 22 | 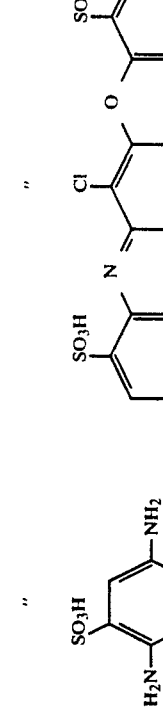 | (structure) | (structure) | Reddish blue |

TABLE-continued

| Example No. | Phenylene-diamine | First intermediate dioxazine compound | Amine compound | Color |
|---|---|---|---|---|
| 23 | " | " | 2-amino-4-(β-sulfatoethylsulfonyl)benzenesulfonic acid (H₂N, SO₃H, SO₂C₂H₄OSO₃H on benzene) | " |
| 24 | " | " | 1-amino-5-(β-sulfatoethylsulfonyl)naphthalene-5-sulfonic acid (naphthalene with H₂N, SO₃H, SO₂C₂H₄OSO₃H) | " |
| 25 | " | " | N-ethyl-4-(β-sulfatoethylsulfonyl)aniline (C₂H₅HN–C₆H₄–SO₂C₂H₄OSO₃H, para) | " |
| 26 | " | " | N-ethyl-3-(β-sulfatoethylsulfonyl)aniline (C₂H₅HN–C₆H₄–SO₂C₂H₄OSO₃H, meta) | " |
| 27 | 1,4-diamino-2,5-benzenedisulfonic acid (H₂N, SO₃H, SO₃H, NH₂ on benzene) | Dioxazine structure with two chlorines, two oxygens, two nitrogens, SO₃H groups and NH₂ groups | 4-amino-3-sulfo-phenyl-β-sulfatoethylsulfone (H₂N, SO₃H, SO₂CH₂CH₂OSO₃H on benzene) | Reddish blue |
| 28 | " | " | 3-aminophenyl vinyl sulfone (H₂N–C₆H₄–SO₂CH=CH₂) | " |

TABLE-continued

| Example No. | Phenylene-diamine | First intermediate dioxazine compound | Amine compound | Color |
|---|---|---|---|---|
| 29 | | | 4-($SO_2C_2H_4OCO-CH_3$)aniline | " |
| 30 | " | " | 4-($SO_2C_2H_4OPO_3H_2$)aniline | " |
| 31 | " | " | 2-amino-1-$SO_3H$-5-($SO_2CH=CH_2$)naphthalene | " |
| 32 | (4-amino-2,5-disulfo phenyl) | dioxazine with Cl, $SO_3H$, $NH_2$ substituents | $H_2N-(CH_2)_2OC_2H_4SO_2-C_2H_4Cl$ | Reddish blue |
| 33 | " | " | $H_2N-(CH_2)_2OC_2H_4SO_2CH=CH_2$ | " |
| 34 | " | " | $H_2N-(CH_2)_3OC_2H_4SO_2CH=CH_2$ | |
| 35 | " | " | 4-($SO_2C_2H_4OSO_3H$)aniline | Reddish blue |
| 36 | (4-amino-2-$OCH_3$-5-$SO_3H$ phenyl) | dioxazine with Cl, $OCH_3$, $SO_3H$, $NH_2$ substituents | 4-amino-2-$OCH_3$-($SO_2C_2H_4OSO_3H$)benzene | " |

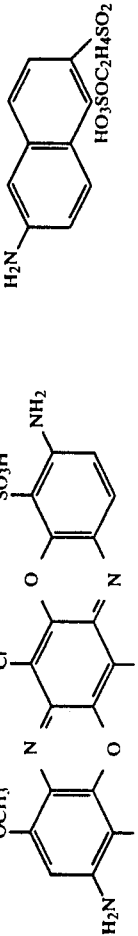

TABLE-continued

| Example No. | Phenylene-diamine | First intermediate dioxazine compound | Amine compound | Color |
|---|---|---|---|---|
| 43 | " | " | 2-amino-4-(β-sulfatoethylsulfonyl)benzenesulfonic acid (H₂N-C₆H₃(SO₃H)-SO₂CH₂CH₂OSO₃H) | " |
| 44 | " | " | 3-aminophenyl vinyl sulfone (H₂N-C₆H₄-SO₂CH=CH₂) | " |
| 45 | " | " | 4-amino-phenyl β-acetoxyethyl sulfone (H₂N-C₆H₄-SO₂C₂H₄OCOCH₃) | " |
| 46 | " | " | 4-amino-phenyl β-phosphatoethyl sulfone (H₂N-C₆H₄-SO₂C₂H₄OPO₃H₂) | " |
| 47 | 4-methoxy-1,3-phenylenediamine-6-sulfonic acid | dioxazine structure (shown) | 6-amino-1-naphthol-type with SO₃H and SO₂CH=CH₂ | Reddish blue |
| 48 | " | " | H₂N—(CH₂)₂OC₂H₄SO₂C₂—H₄Cl | " |
| 49 | " | " | H₂N—(CH₂)₂OC₂H₄SO₂CH=CH₂ | " |
| 50 | " | " | H₂N—(CH₂)₃OC₂H₄SO₂CH=CH₂ | " |

EXAMPLE 51

Example 1 was repeated, except that the sulfanilic acid used in Example 1 was replaced by compounds as described below, thereby obtaining the corresponding asymmetric dioxazine compounds.
(1) Orthanilic acid
(2) Methanilic acid
(3) 1-Aminonaphthalene-3,6-disulfonic acid
(4) 1-Aminonaphthalene-4,6,8-trisulfonic acid
(5) 2-Aminonaphthalene-4,8-disulfonic acid
(6) 2-Aminonaphthalene-3,6,8-trisulfonic acid
(7) Aniline-2,5-disulfonic acid
(8) Aniline
(9) m-Toluidine
(10) o-Anisidine
(11) Ammonia
(12) Ethylamine
(13) Ethanolamine
(14) β-Alanine
(15) Taurine
(16) N-Methyltaurine

EXAMPLE 52

Each of Examples 3 to 50 was repeated, except that the sulfanilic acid was replaced by amine compounds (1) to (16) respectively in Example 51, thereby obtaining the corresponding asymmetric dioxazine compounds.

DYEING EXAMPLE 2

The asymmetric dioxazine compounds obtained in Examples 3 to 52 (each of 0.1, 0.3 and 0.6 parts) were dissolved respectively in water (200 parts) to prepare each dye bath. Sodium sulfate (10 parts) and cotton (10 parts) were added thereto. The baths were heated to 60° C., and then sodium carbonate (4 parts) was added thereto. Dyeing was continued for 1 hour at 60° C. Thereafter, the cotton taken out was washed with water, soaped, again washed with water and then dried to obtain dyed products of a blue color superior in fastness properties, particularly those such as chlorine fastness. The build-up properties were also found to be superior.

EXAMPLE 53

Example 1 was repeated, except that the sulfanilic acid and 1-aminobenzene-3-β-sulfatoethylsulfone to be subjected to the condensation reaction were exchanged in the reaction order. The same asymmetric dioxazine compound as in Example 1 was obtained.

EXAMPLE 54

Aniline-2,5-disulfonic acid (25.3 parts) was dissolved in water (250 parts), with sodium carbonate added to perform neutralization. To this solution was added cyanuric chloride (18.5 parts) at 5° to 30° C., and the mixture was stirred at that temperature to complete the reaction. The first intermediate dioxazine compound (62.5 parts) which had been prepared in the same manner as in Example 1, was added to the above reaction mixture. The resulting mixture was allowed to react, with sodium carbonate being added to neutralize the hydrochloric acid produced, thereby obtaining the second intermediate dioxazine compound corresponding to that in Example 51 (7).

A mixture of the intermediate dioxazine compound obtained above and 1-aminobenzene-3-β-sulfatoethylsulfone (23.1 parts) was heated to 50° to 70° C., while the pH was controlled within a range of 2 to 5, and the mixture was stirred to complete the reaction. Salting out using potassium chloride and the isolation of the crystals produced gave a desired asymmetric dioxazine compound represented by the following formula in the free acid form.

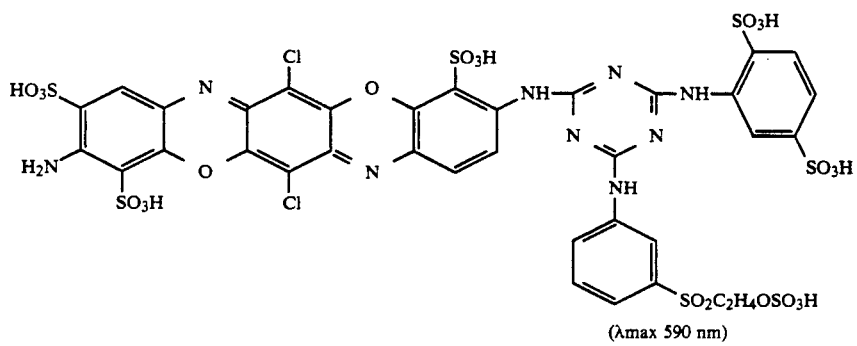

(λmax 590 nm)

The dioxazine compound was found to be the same as that obtained in Example 51 (7).

EXAMPLES 55 TO 69

Example 1 was repeated to obtain intermediate dioxazine compounds which are as shown in the following table and which correspond to the first intermediate dioxazine compound in Example 1, except that the 1,4-phenylenediamine-2,6-disulfonic acid used in Example 1 was replaced by a phenylenediamine as shown in the table. Using the intermediate dioxazine compound, any of the procedures described in Examples 1, 53 and 54 was carried out to obtain a corresponding asymmetric dioxazine compound, except that the sulfanilic acid used in Examples 1 and 53 and aniline-2,5-disulfonic acid used in Example 54 were replaced by a compound (IV) and a phenylenediamine as shown in the table, respectively and the 1-aminobenzene-3-β-sulfatoethylsulfone was replaced by an amine compound as shown in the following table.

TABLE

| Example No. | Phenylenediamine | Intermediate dioxazine compound | Compound (IV) | Amine compound | Color on cotton |
|---|---|---|---|---|---|
| 55 | 2,4-diamino-benzene-1,5-disulfonic acid structure | dioxazine intermediate with SO₃H, NH₂, Cl substituents | morpholine | 3-aminophenyl-SO₂C₂H₄OSO₃H | Reddish blue |
| 56 | " | " | " | 4-aminophenyl-SO₂C₂H₄OSO₃H | " |
| 57 | " | " | NH(C₂H₄OH)₂ | 4-(N-ethylamino)phenyl-SO₂C₂H₄OSO₃H | " |
| 58 | " | " | 2-aminobenzene-1,4-disulfonic acid | 2,5-dimethoxy-4-amino-phenyl-SO₂C₂H₄OSO₃H | " |
| 59 | 2-amino-benzene-1,4-disulfonic acid structure | dioxazine intermediate | 2-aminobenzene-1,4-disulfonic acid | H₂N—(CH₂)₂OC₂H₄SO₂C₂H₄Cl | Reddish blue |
| 60 | 4-amino-benzene-1,3-disulfonic acid structure | dioxazine intermediate | morpholine | 3-aminophenyl-SO₂C₂H₄OSO₃H | " |

TABLE-continued

| Example No. | Phenylenediamine | Intermediate dioxazine compound | Compound (IV) | Amine compound | Color on cotton |
|---|---|---|---|---|---|
| 61 | " | " | " | 4-H₂N-C₆H₄-SO₂C₂H₄OSO₃H | " |
| 62 | " | " | NH(C₂H₄OH)₂ | 4-(C₂H₅)NH-C₆H₄-SO₂C₂H₄OSO₃H | " |
| 63 | (2,5-diamino benzene-1,4-disulfonic acid derivative) | (dioxazine with SO₃H groups) | 2,5-SO₃H-aniline | 2-OCH₃,5-SO₂C₂H₄OSO₃H-aniline | Reddish blue |
| 64 | " | " | " | H₂N-(CH₂)₂OC₂H₄SO₂C₂H₄Cl | " |
| 65 | (2-OCH₃ diamino derivative) | (dioxazine) | morpholine | 3-H₂N-C₆H₄-SO₂C₂H₄OSO₃H | " |
| 66 | " | " | " | 4-H₂N-C₆H₄-SO₂C₂H₄OSO₃H | " |
| 67 | " | " | HN(C₂H₄OH)₂ | 4-(C₂H₅)NH-C₆H₄-SO₂C₂H₄OSO₃H | Reddish blue |

TABLE-continued
| Example No. | Phenylenediamine | Intermediate dioxazine compound | Compound (IV) | Amine compound | Color on cotton |
|---|---|---|---|---|---|
| 68 | " | " |  |  | " |
| 69 | " | " | " | $H_2N-(CH_2)_2OC_2H_4SO_2C_2H_4Cl$ | " |

DYEING EXAMPLE 3

Each of the asymmetric dioxazine compounds obtained in Examples 54 to 69 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour 60° C. The cotton taken out was washed with water, soaped, again washed with water and then dried to obtain dyed products of a blue color superior in fastness properties, particularly those such as chlorine fastness. The dioxazine compounds were also found to be superior in build-up properties.

EXAMPLE 70

2-Methoxy-4,6-dichloro-s-triazine (18 parts) and the same intermediate dioxazine compound (62.5 parts) as that in Example 1 were subjected to a condensation reaction with each other at 30° to 50° C. within a pH of 2 to 7, followed by a condensation reaction with 1-aminobenzene-3-β-sulfatoethylsulfone (28.1 parts). Thereafter salting-out gave an asymmetric dioxazine compound represented by the following formula in the free acid form.

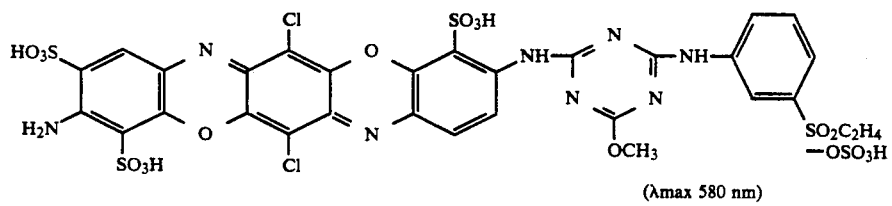

(λmax 580 nm)

EXAMPLES 71-97

Example 70 was repeated to obtain a desired asymmetric dioxazine compound, except that the intermediate dioxazine compound, 2-methoxy-4,6-dichloro-s-triazine and 1-aminobenzene-3-β-sulfatoethylsulfone used in Example 70 were replaced by an intermediate dioxazine compound, a dichlorotriazine and an amine compound as shown in the following table, respectively.

TABLE

| Example No. | Intermediate dioxazine compound | Dichlorotriazine Q' | Amine compound | Color on cotton |
|---|---|---|---|---|
| 71 | [dioxazine with SO₃H, NH₂, O, N, Cl, Cl, N, O, SO₃H, HO₃S, H₂N substituents] | —OCH₃ | H₂N–naphthalene(SO₃H)–SO₂C₂H₄OSO₃H | Reddish blue |
| 72 | " | " | H₂N–C₆H₃(OCH₃)–SO₂CH=CH₂ | " |
| 73 | " | " | H₂N–naphthalene–SO₂C₂H₄OSO₃H | " |
| 74 | [same dioxazine structure] | —OC₂H₅ | H₂N–C₆H₃(SO₃H)–SO₂C₂H₄OSO₃H | Reddish blue |
| 75 | " | —OCH₃ | C₂H₅HN–C₆H₄–SO₂C₂H₄OSO₃H | " |

TABLE-continued

| Example No. | Intermediate dioxazine compound | Dichloro-triazine Q' | Amine compound | Color on cotton |
|---|---|---|---|---|
| 76 | | " | 3-(C₂H₅)(HN)-C₆H₄-SO₂C₂H₄OSO₃H | " |
| 77 | " | " | H₂N—(CH₂)₂OC₂H₄SO₂C₂H₄Cl | " |
| 78 | " | " | H₂N—(CH₂)₂OC₂H₄SO₂CH=CH₂ | Reddish blue |
| 79 | (dioxazine with SO₃H, NH₂, Cl, HO₃S, H₂N groups) | —OCH₃ | H₂N—(CH₂)₂OC₂H₄SO₂CH=CH₂ | " |
| 80 | (dioxazine with SO₃H, NH₂, Cl, SO₃H, H₂N groups) | " | 2-amino-6-(SO₂C₂H₄OSO₃H)-8-SO₃H-naphthalene | " |
| 81 | " | " | 4-H₂N-2-(SO₂CH=CH₂)-anisole | " |
| 82 | " | " | 2-amino-6-(SO₂C₂H₄OSO₃H)-naphthalene | " |

TABLE-continued

| Example No. | Intermediate dioxazine compound | Dichloro-triazine Q' | Amine compound | Color on cotton |
|---|---|---|---|---|
| 83 | (dioxazine structure with SO₃H, NH₂, Cl groups) | —OC₂H₅ | 4-amino-3-sulfo-phenyl-SO₂C₂H₄OSO₃H | Reddish blue |
| 84 | " | —OCH₃ | 4-(N-ethylamino)phenyl-SO₂C₂H₄OSO₃H | " |
| 85 | " | " | 3-(N-ethylamino)phenyl-SO₂C₂H₄OSO₃H | " |
| 86 | " | " | $H_2N-(CH_2)_2OC_2H_4SO_2C_2H_4Cl$ | " |
| 87 | " | " | $H_2N-(CH_2)_2OC_2H_4SO_2CH=CH_2$ | " |
| 88 | (dioxazine structure with SO₃H, NH₂, Cl groups) | —OCH₃ | $H_2N-(CH_2)_2OC_2H_4SO_2CH=CH_2$ | Reddish blue |

TABLE-continued

| Example No. | Intermediate dioxazine compound | Dichlorotriazine | Q' | Amine compound | Color on cotton |
|---|---|---|---|---|---|
| 89 | (dioxazine with OCH₃, SO₃H, H₂N, NH₂, Cl substituents) | (dichlorotriazine structure) | | 2-amino-6-(2-sulfatoethylsulfonyl)-8-sulfonaphthalene | " |
| 90 | " | " | | 4-methoxy-2-(vinylsulfonyl)aniline | " |
| 91 | " | " | | 2-amino-6-(2-sulfatoethylsulfonyl)naphthalene | " |
| 92 | " | | —OC₂H₅ | 2-amino-5-(2-sulfatoethylsulfonyl)benzenesulfonic acid | " |
| 93 | (dioxazine as shown) | | —OCH₃ | N-ethyl-4-(2-sulfatoethylsulfonyl)aniline | Reddish blue |

TABLE-continued
| Example No. | Intermediate dioxazine compound | Dichloro-triazine Q' | Amine compound | Color on cotton |
|---|---|---|---|---|
| 94 | " | 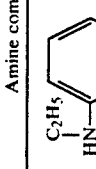 | 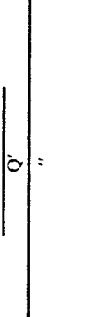 | " |
| 95 | " | " | $H_2N-(CH_2)_2OC_2H_4SO_2C_2H_4Cl$ | " |
| 96 | " | " | $H_2N-(CH_2)_2OC_2H_4SO_2CH=CH_2$ | " |
| 97 | " | " | $H_2N-(CH_2)_3OC_2H_4SO_2CH=CH_2$ | " |

DYEING EXAMPLE 4

Each of the asymmetric dioxazine compounds obtained in Examples 70 to 97 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 98

To an aqueous solution containing the same second intermediate dioxazine compound as in Example 1 was added diethylsulfuric acid, and the mixture was stirred at 50° to 90° C. within a pH range of 6 to 9, thereby obtaining an intermediate dioxazine compound represented by the following formula in the free acid form.

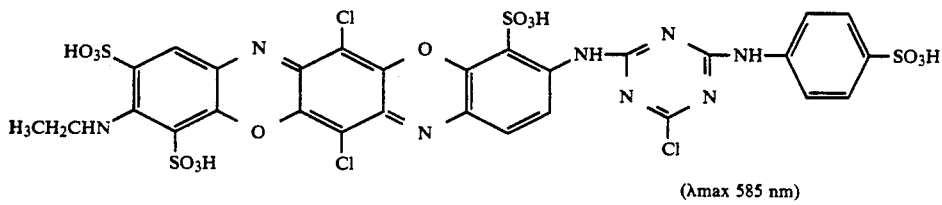

A mixture of the above intermediate dioxazine compound and 1-aminobenzene-3-β-sulfatoethylsulfone in water was stirred at 50° to 70° C. within a pH range of 2 to 5 to complete the reaction. Thereafter, salting-out using sodium chloride and the isolation of the crystals produced gave an asymmetric dioxazine compound represented by the following formula in the free acid form.

EXAMPLE 99

In a manner similar to that of Example 98, each intermediate dioxazine compound which had been obtained in the manner described in Example 51 was used to obtain a corresponding asymmetric dioxazine compound.

DYEING EXAMPLE 5

Each of the asymmetric dioxazine compounds obtained in Examples 98 and 99 (each of 0.1, 0.3 and 0.6 parts) were dissolved in water (200 parts), and sodium sulfate (10 parts) and cotton (10 parts) were added thereto. The bath were heated to 60° C. and then sodium carbonate (4 parts) was added thereto. Thereafter, dyeing was continued for 1 hour at that temperature. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 100

The second intermediate dioxazine compound obtained in Example 1 was dissolved in water, and an excess amount of acetic anhydride was added thereto. The mixture was allowed to react at 30° to 70° C., thereby obtaining an intermediate dioxazine represented by the following formula in the free acid form.

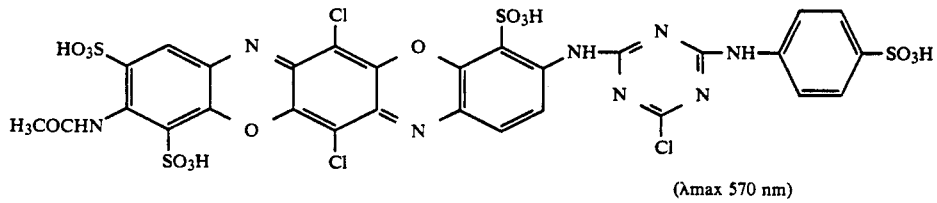

(λmax 570 nm)

The intermediate dioxazine and 1-aminobenzene-3-β-sulfatoethylsulfone in an amount equimolar to the intermediate dioxazine were added to water, and allowed to react at 50° to 70° C. and pH 2 to 5, while being stirred.

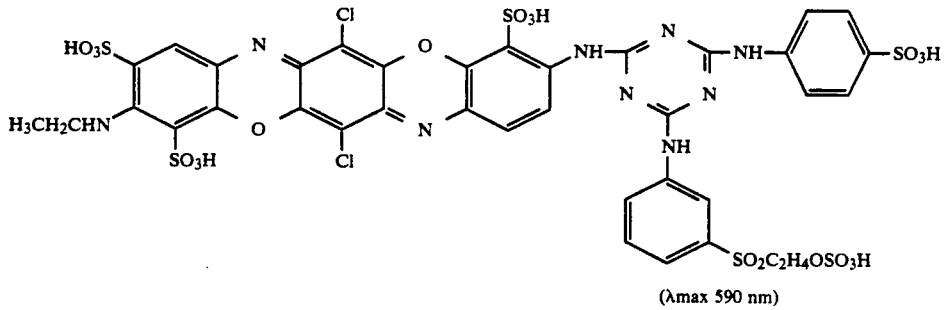

(λmax 590 nm)

Thereafter, salting out of the reaction mixture with sodium chloride and the isolation of the crystals produced gave an asymmetric dioxazine compound represented by the following formula in the free acid form.

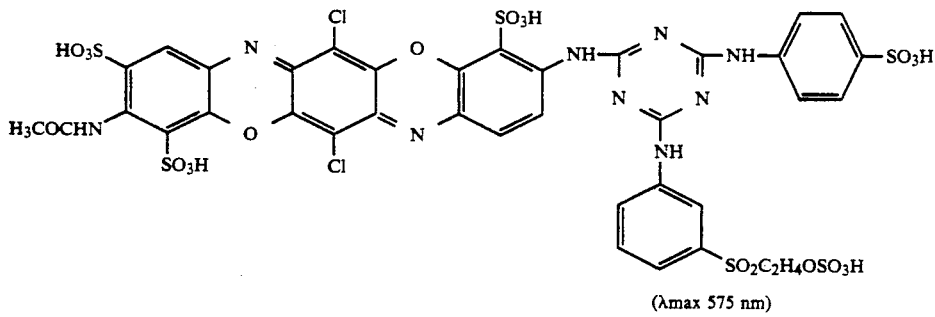

($\lambda$max 575 nm)

EXAMPLE 101

Using each of the intermediate dioxazine compounds obtained in Example 51, Example 100 was repeated to obtain the corresponding asymmetric dioxazine compounds.

DYEING EXAMPLE 6

Each of the asymmetric dioxazine compounds obtained in Examples 100 and 101 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water add then dried to obtain dyed products of a blue color superior in fastness properties, particularly chlorine fastness. The dioxazine compounds were also found to be superior in build-up properties.

EXAMPLE 102

The first intermediate dioxazine compound obtained in Example 1 (62.5 parts) was dissolved in water (1500 parts), and cyanuric chloride (13.5 parts) was added thereto at 5° to 30° C. The mixture was stirred to complete the reaction, while keeping the pH within a range of 2 to 7 using sodium carbonate. Successively, 1-aminobenzene-3-$\beta$-sulfatoethylsulfone (28.1 parts) was added thereto. The mixture was stirred at 10° to 50° C., while keeping the pH within a range of 2 to 6, thereby obtaining an asymmetric dioxazine compound represented by the following formula in the free acid form.

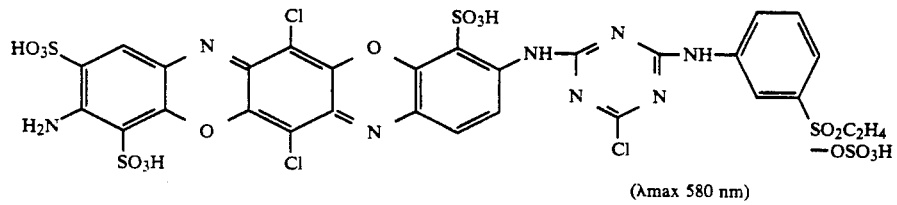

($\lambda$max 580 nm)

EXAMPLES 103 TO 150

Using the phenylenediamines as shown in the following table, Example 1 was repeated to obtain intermediate dioxazine compounds corresponding to the first intermediate dioxazine compound in Example 1. The intermediate dioxazine compounds obtained were allowed to react with cyanuric chloride (18.5 parts). Using the resulting second intermediate dioxazine compound, Example 102 was repeated, except that the 1-aminobenzene-3-$\beta$-sulfatoethylsulfone was replaced by an amine as shown in the following table, thereby obtaining corresponding asymmetric dioxazine compounds.

TABLE

| Example No. | Phenylene-diamine | First intermediate dioxazine compound | Amine | Color on cotton |
|---|---|---|---|---|
| 103 | 2,4-diamino-benzene-1,3-disulfonic acid (H₂N–C₆H₂(SO₃H)₂–NH₂) | dioxazine with HO₃S, H₂N, SO₃H, NH₂ substituents and two Cl on central ring | 4-amino-phenyl-SO₂C₂H₄OSO₃H | Reddish blue |
| 104 | " | " | 4-amino-2-methoxy-phenyl-SO₂C₂H₄OSO₃H | " |
| 105 | " | " | 6-amino-naphthalene with HO₃SOC₂H₄SO₂ | " |
| 106 | " | " | 4-amino-3-methoxy-phenyl-SO₂C₂H₄OSO₃H | " |
| 107 | " | " | 3-amino-4-sulfo-phenyl-SO₂C₂H₄OSO₃H | Reddish blue |
| 108 | " | " | 2-amino-naphthalene-SO₃H, SO₂C₂H₄OSO₃H | " |

TABLE-continued

| Example No. | Phenylene-diamine | First intermediate dioxazine compound | Amine | Color on cotton |
|---|---|---|---|---|
| 109 | " | " | 4-(N-ethyl-N-(β-sulfatoethylsulfonyl))aminobenzene (C₂H₅HN-C₆H₄-SO₂C₂H₄OSO₃H, para) | " |
| 110 | " | " | 3-(N-ethyl-N-(β-sulfatoethylsulfonyl))aminobenzene (C₂H₅HN-C₆H₄-SO₂C₂H₄OSO₃H, meta) | " |
| 111 | " | " | 2-amino-4-(β-sulfatoethylsulfonyl)-1-sulfobenzene (H₂N-C₆H₃(SO₃H)-SO₂CH₂CH₂OSO₃H) | " |
| 112 | 2,4-diamino-1,3-benzenedisulfonic acid (H₂N-C₆H₂(SO₃H)₂-NH₂) | dioxazine structure with two amino-sulfo-phenoxy groups linked to dichlorodioxazine core | 3-amino-(vinylsulfonyl)benzene (H₂N-C₆H₄-SO₂CH=CH₂) | Reddish blue |
| 113 | " | " | 4-(β-acetoxyethylsulfonyl)aniline (H₂N-C₆H₄-SO₂C₂H₄OCOCH₃) | " |
| 114 | " | " | 4-(β-phosphatoethylsulfonyl)aniline (H₂N-C₆H₄-SO₂C₂H₄OPO₃H₂) | " |
| 115 | " | " | 2-amino-1-sulfo-5-(vinylsulfonyl)naphthalene | " |

| Example No. | Phenylene-diamine | First intermediate dioxazine compound | Amine | Color on cotton |
|---|---|---|---|---|
| 116 | " | " | $H_2N-(CH_2)_2OC_2H_4SO_2C_2H_4-Cl$ | " |
| 117 | " | (structure) | $H_2N-(CH_2)_2OC_2H_4SO_2CH=CH_2$ | Reddish blue |
| 118 | " | " | $H_2N-(CH_2)_3OC_2H_4SO_2CH=CH_2$ | " |
| 119 | (structure) | (structure) | (aniline with $SO_2C_2H_4OSO_3H$) | " |
| 120 | " | " | (aminoanisole with $SO_2C_2H_4OSO_3H$) | " |
| 121 | " | " | (aminonaphthalene with $SO_3H$ and $HO_3SOC_2H_4SO_2$) | " |
| 122 | (structure) | (structure) | (aminoanisole with $OCH_3$ and $SO_2C_2H_4OSO_3H$) | Reddish blue |

TABLE-continued

| Example No. | Phenylene-diamine | First intermediate dioxazine compound | Amine | Color on cotton |
|---|---|---|---|---|
| 123 | (same structure as 128) | (dioxazine structure shown) | 2-amino-4-(2-sulfatoethylsulfonyl)benzenesulfonic acid (H₂N, SO₃H, SO₂C₂H₄OSO₃H on benzene) | " |
| 124 | " | " | 2-amino-5-(2-sulfatoethylsulfonyl)naphthalene-1-sulfonic acid (H₂N, SO₃H, SO₂C₂H₄OSO₃H on naphthalene) | " |
| 125 | " | " | N-ethyl-4-(2-sulfatoethylsulfonyl)aniline (C₂H₅HN—C₆H₄—SO₂C₂H₄OSO₃H, para) | " |
| 126 | " | " | N-ethyl-3-(2-sulfatoethylsulfonyl)aniline (C₂H₅HN—C₆H₄—SO₂C₂H₄OSO₃H, meta) | " |
| 127 | " | " | 2-amino-5-(3-sulfatopropylsulfonyl)benzenesulfonic acid (H₂N, SO₃H, SO₂CH₂CH₂OSO₃H on benzene) | Reddish blue |
| 128 | 1,4-diaminobenzene-2,5-disulfonic acid (H₂N, SO₃H, SO₃H, H₂N on benzene) | (dioxazine structure with two chloro-substituted central rings and peripheral aromatic rings bearing SO₃H, NH₂ groups) | 3-aminophenyl vinyl sulfone (H₂N—C₆H₄—SO₂CH=CH₂, meta) | " |

TABLE-continued

| Example No. | Phenylene-diamine | First intermediate dioxazine compound | Amine | Color on cotton |
|---|---|---|---|---|
| 129 | (4-amino-2-sulfo-5-sulfo-phenyl; structure shown) | (dioxazine structure) | 4-H₂N-C₆H₄-SO₂C₂H₄OCO—CH₃ | " |
| 130 | " | " | 4-H₂N-C₆H₄-SO₂C₂H₄OPO₃H₂ | " |
| 131 | " | " | 2-amino-1-sulfo-5-(SO₂CH=CH₂)-naphthalene | " |
| 132 | " | " | H₂N—(CH₂)₂OC₂H₄SO₂—C₂H₄Cl | Reddish blue |
| 133 | " | " | H₂N—(CH₂)₂OC₂H₄SO₂CH=CH₂ | " |
| 134 | " | " | H₂N—(CH₂)₃OC₂H₄SO₂CH=CH₂ | " |
| 135 | (4-amino-5-methoxy-2-sulfophenyl) | (dioxazine with OCH₃) | 4-H₂N-C₆H₄-SO₂C₂H₄OSO₃H | " |
| 136 | " | " | 4-H₂N-2-OCH₃-C₆H₃-SO₂C₂H₄OSO₃H | " |

TABLE-continued

| Example No. | Phenylene-diamine | First intermediate dioxazine compound | Amine | Color on cotton |
|---|---|---|---|---|
| 137 | 4-methoxy-1,3-phenylenediamine-6-sulfonic acid | dichlorodioxazine (OCH₃, SO₃H, NH₂ substituted) | 6-amino-2-(2-sulfatoethylsulfonyl)naphthalene with HO₃SOC₂H₄SO₂ group | Reddish blue |
| 138 | " | " | 2-amino-4-(2-sulfatoethylsulfonyl)anisole (OCH₃, H₂N, SO₂C₂H₄OSO₃H) | " |
| 139 | " | " | 2-amino-4-(2-sulfatoethylsulfonyl)benzenesulfonic acid (SO₃H, H₂N, SO₂C₂H₄OSO₃H) | " |
| 140 | " | " | 2-amino-6-(2-sulfatoethylsulfonyl)-8-naphthalenesulfonic acid | " |
| 141 | " | " | N-ethyl-4-(2-sulfatoethylsulfonyl)aniline (C₂H₅HN—, SO₂C₂H₄OSO₃H) | " |
| 142 | 4-methoxy-1,3-phenylenediamine-6-sulfonic acid | dichlorodioxazine (OCH₃, SO₃H, NH₂ substituted) | N-ethyl-3-(2-sulfatoethylsulfonyl)aniline (C₂H₅HN—, SO₂C₂H₄OSO₃H) | Reddish blue |

TABLE-continued

| Example No. | Phenylene-diamine | First intermediate dioxazine compound | Amine | Color on cotton |
|---|---|---|---|---|
| 143 | ![OCH3, NH2, SO3H, H2N phenylenediamine] | ![dioxazine with OCH3, SO3H, Cl, N, O groups and NH2, SO3H] | H2N-C6H3(SO3H)-SO2CH2CH2OSO3H | " |
| 144 | " | " | H2N-C6H4-SO2CH=CH2 (meta) | " |
| 145 | " | " | H2N-C6H4-SO2C2H4OCOCH3 (para) | " |
| 146 | " | " | H2N-C6H4-SO2C2H4OPO3H2 (para) | " |
| 147 | " | " | ![naphthalene with H2N, SO3H, SO2CH=CH2] | Reddish blue |
| 148 | " | " | H2N—(CH2)2OC2H4SO2C2—H4Cl | " |
| 149 | " | " | H2N—(CH2)2OC2H4SO2CH=CH2 | " |
| 150 | " | " | H2N—(CH2)3OC2H4SO2CH=CH2 | " |

DYEING EXAMPLE 7

Each of the asymmetric dioxazine compounds obtained in Examples 102 to 150 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at that temperature. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 151

To the reaction mixture containing the asymmetric dioxazine compound which had been obtained in the same manner as in Example 102, sulfanilic acid (17.3 parts) was added. The mixture was stirred to complete the reaction at 50° to 70° C., while keeping the pH within a range of 2 to 5, thereby obtaining the same asymmetric dioxazine compound as in Example 1.

Similarly, the asymmetric dioxazine compounds obtained in Examples 103 to 150 were treated to obtain the same asymmetric dioxazine compounds as those in Examples 3 to 50, respectively.

EXAMPLE 152

A asymmetric dioxazine compound (101.8 parts) which had been obtained in the same manner as in Example 102 was dissolved in water (1500 parts), and 1-aminobenzene-3-β-sulfatoethylsulfone (28.1 parts) was added thereto. The mixture was stirred at 40° to 90° C., while keeping the PH within a range of 2 to 6 using aqueous sodium carbonate solution, thereby obtaining an asymmetric dioxazine compound represented by the following formula in the free acid form.

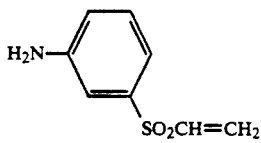 (1)

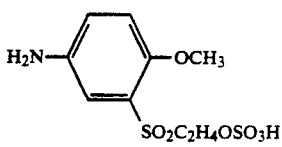 (2)

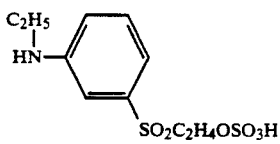 (3)

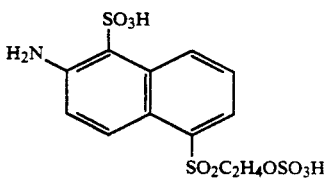 (4)

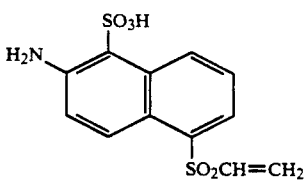 (5)

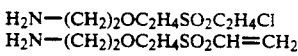 (6)
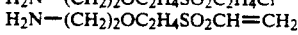 (7)

DYEING EXAMPLE 8

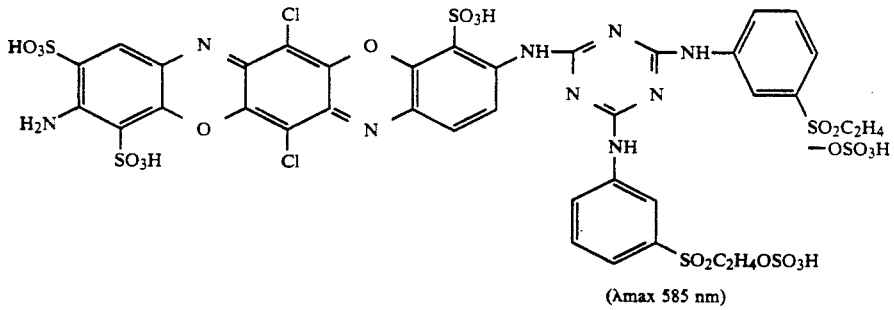

(λmax 585 nm)

EXAMPLE 153

Using the asymmetric dioxazine compounds obtained in Examples 103 to 150, Example 152 was repeated, except that the amines described below were used in place of the 1-aminobenzene-3-β-sulfatoethylsulfone used in Example 52 in an amount equimolar thereto, thereby obtaining corresponding asymmetric dioxazine compounds.

Each of the asymmetric dioxazine compounds obtained in Examples 152 and 153 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 154

An intermediate dioxazine compound (54.6 parts) represented by the following formula,

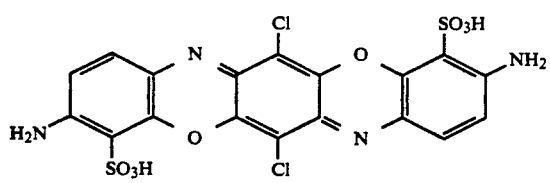

was added to 5 to 23% oleum (1000 parts), and the mixture was stirred at 80° to 100° C. The reaction mixture was poured into ice water to produce crystals, which were then separated on a filter. The cake obtained was mixed with water and adjusted to pH 2 to 7 using aqueous sodium hydroxide solution. Cyanuric chloride (18.5 parts) was added thereto at 5° to 30° C., and the mixture was stirred to complete the reaction, while keeping the pH within a range of 2 to 7 using aqueous sodium carbonate solution. Sulfanilic acid (17.3 parts) was then added thereto, and the mixture was stirred to complete the reaction at 30° to 50° C. and a pH 2 to 7. To this reaction mixture was added 1-aminobenzene-4-$\beta$-sulfatoethylsulfone (28.1 parts), and the mixture was heated to 50° to 70° C., while keeping the pH within a range of 2 to 5, and stirred to complete the reaction under these conditions. The reaction mixture was allowed to cool to ambient temperature and then mixed with potassium chloride. The isolation of the crystals produced gave a desired product, which was found to be a mixture of the asymmetric dioxazine compound obtained in Example 3 and the asymmetric dioxazine compound obtained in Example 19.

| -continued | |
|---|---|
| Balance (water) | 13 parts |

Mercerized cotton broad cloths were printed with the color pastes having the above composition, predried and steamed at 100° C. for 5 minutes. The treated cloths were washed with hot water, soaped, again washed with hot water and then dried. Thus, there were obtained printed products of a blue color excellent in fastness properties, particularly chlorine fastness.

EXAMPLE 155

A dioxazine compound (55 parts) having the following formula in the free acid form,

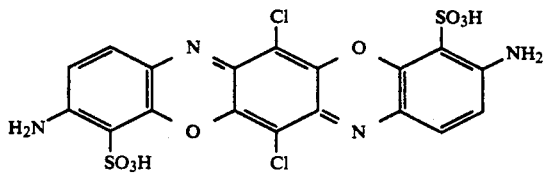

and cyanuric chloride (18 parts) were added to water (1500 parts), and the mixture was stirred to complete the reaction at 0° to 30° C., while keeping the pH within a range of 5 to 8 using sodium carbonate. To the reaction mixture was added taurine (13 parts), and the mixture was stirred to complete the reaction at 10° to 50° C., while keeping the pH within a range of 4 to 7. Additional taurine (13 parts) was then added thereto, and the mixture was stirred to complete the reaction at 30° to 80° C. and pH 4 to 7, thereby obtaining an intermediate dioxazine compound represented by the following formula in the free acid form.

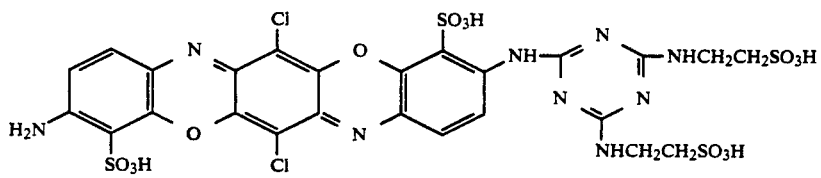

DYEING EXAMPLE 9

Using the same asymmetric dioxazine compounds as used in Dyeing Examples 1 to 8, color pastes having the following composition were prepared.

| Asymmetric dioxazine compound | 5 parts |
|---|---|
| Urea | 5 parts |
| Sodium alginate (5%) stock paste | 50 parts |
| Hot water | 25 parts |
| Sodium hydrogencarbonate | 2 parts |

A mixture of the intermediate dioxazine compound (87 parts) and cyanuric chlorine (18 parts) in water (1500 parts) was stirred to complete the reaction at 0° C. to 30° C., while keeping the pH within a range of 5 to 8 using sodium carbonate. To the reaction mixture was added taurine (13 parts), and the mixture was stirred to complete the reaction at 10° to 50° C. and at pH 4 to 7. 1-aminobenzene-3-$\beta$-sulfatoethylsulfone (28 parts) was then added thereto, and the mixture was stirred to complete the reaction at 30° to 80° C. and at pH 4 to 7, thereby obtaining an asymmetric dioxazine compound of the following formula in the free acid form.

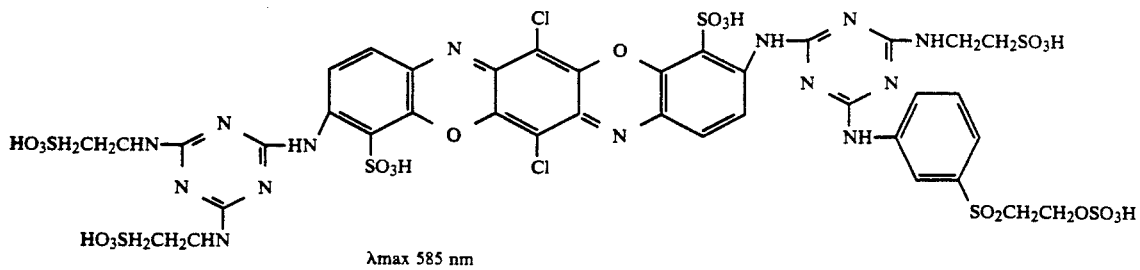

λmax 585 nm

EXAMPLE 156

Example 155 was repeated, except that a dioxazine compound of the following formula in the free acid form,

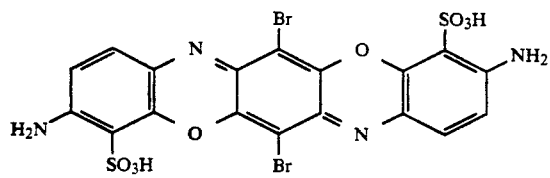

was used in place of the starting dioxazine compound used in Example 155 in an amount equimolar thereto, thereby obtaining an asymmetric dioxazine compound of the following formula in the free acid form.

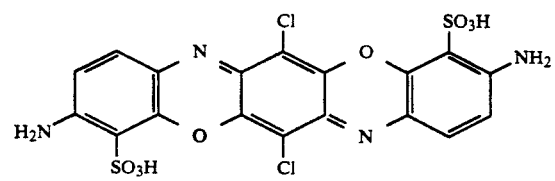

and cyanuric chloride (18 parts) in water (1500 parts) was stirred to complete the reaction at 0° to 30° C., while controlling the pH within a range of 5 to 8. To the reaction mixture was added sulfanilic acid (17 parts), and the mixture was stirred to complete the reaction at 10° to 50° C. and at pH 4 to 7. Thereafter, methanilic acid (17 parts) was added thereto, and the mixture was stirred to complete the reaction at 30° to 80° C. and at pH 4 to 7, thereby obtaining an intermediate dioxazine compound.

Using the intermediate dioxazine compound, the procedure corresponding to Example 155 was repeated to obtain an asymmetric dioxazine compound of the following formula in the free acid form.

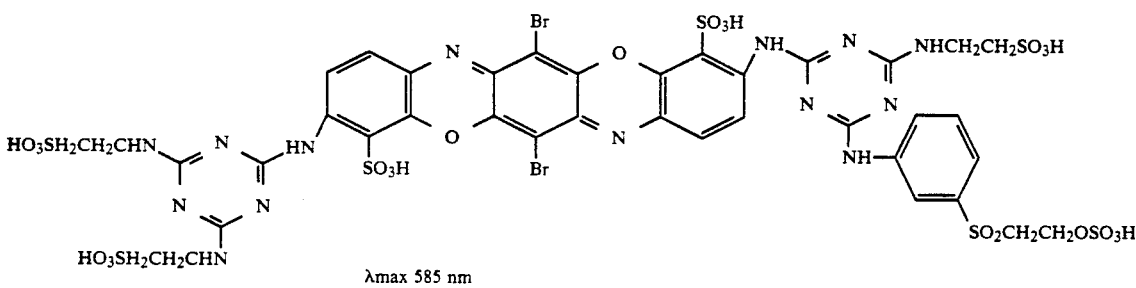

λmax 585 nm

EXAMPLE 157

A mixture of a dioxazine compound (55 parts) of the following formula in the free acid form,

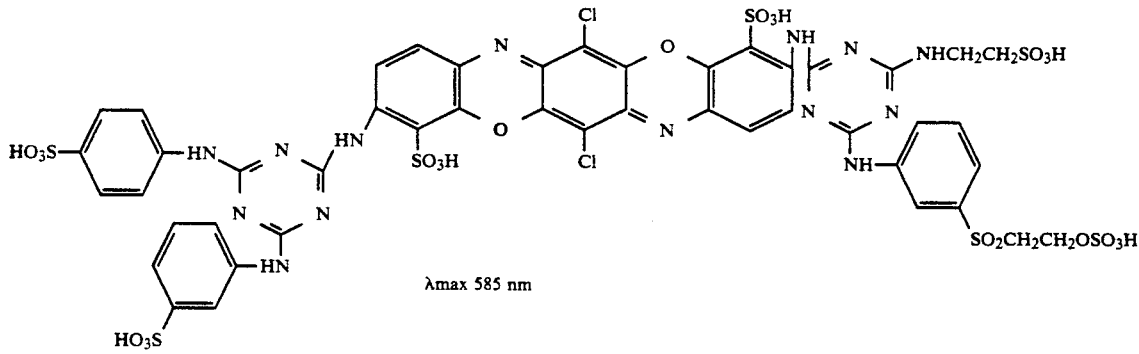

λmax 585 nm

EXAMPLE 158

Each of the asymmetric dioxazine compounds obtained in Examples 155 to 157 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a reddish blue color superior in fastness properties, particularly chlorine fastness. The dioxazine compounds were also found to be superior in build-up properties.

EXAMPLE 159

Example 155 was repeated, except that the amines described below were used in place of the 1-aminobenzene-3-β-sulfatoethylsulfone in an amount equimolar thereto, thereby obtaining respective corresponding asymmetric dioxazine compounds.

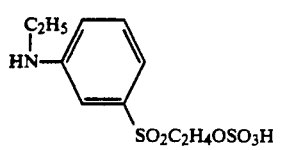
(1)

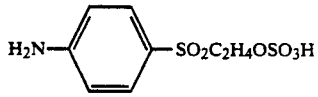
(2)

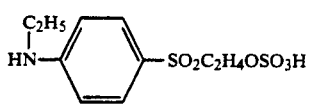
(3)

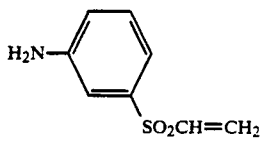
(4)

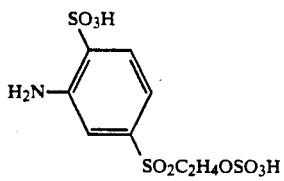
(5)

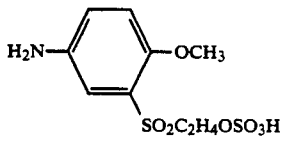
(6)

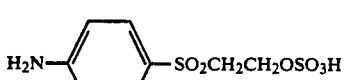
(7)

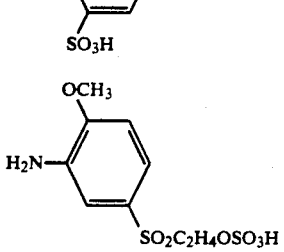
(8)

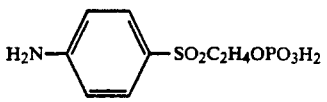
(9)

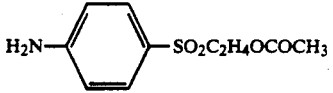
(10)

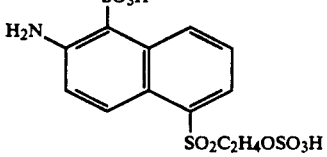
(11)

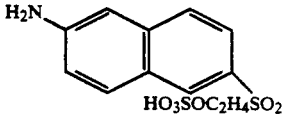
(12)

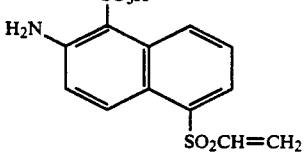
(13)

H$_2$N—(CH$_2$)$_2$OC$_2$H$_4$SO$_2$C$_2$H$_4$Cl (14)

H$_2$N—(CH$_2$)$_2$OC$_2$H$_4$SO$_2$CH=CH$_2$ (15)

H$_2$N—(CH$_2$)$_3$OC$_2$H$_4$SO$_2$CH=CH$_2$ (16)

EXAMPLE 160

Example 155 was repeated, except that the amine compounds described below were used in place of the taurine used in Example 155 in an amount equimolar thereto, thereby obtaining respective corresponding asymmetric dioxazine compounds.

(1) N-Methyltaurine
(2) β-Alanine
(3) Ethanolamine
(4) Diethanolamine
(5) Ethylamine
(6) Ammonia
(7) Sulfanilic acid
(8) Methanilic acid
(9) Orthanilic acid
(10) Aniline
(11) Aniline-2,5-disulfonic acid
(12) 2-Aminonaphthalene-3,6,8-trisulfonic acid
(13) 1-Aminonaphthalene-3,6-disulfonic acid

EXAMPLE 161

Example 160 was repeated, except that amines (1) to (16) described in Example 159 were used in place of the 1-aminobenzene-3-β-sulfatoethylsulfone used in Example 160, thereby obtaining corresponding asymmetric dioxazine compounds.

EXAMPLE 162

Each of the asymmetric dioxazine compounds obtained in Examples 159 to 161 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a reddish blue color superior in fastness properties, particularly chlorine fastness. The dioxazine compounds were also found to be superior in build-up properties.

EXAMPLE 163

Example 155 was repeated, except that the reaction order of the 1-aminobenzene-3-β-sulfatoethylsulfone and taurine was exchanged, thereby obtaining the same asymmetric dioxazine compound as in Example 155.

EXAMPLE 164

A mixture of a dioxazine compound (55 parts) having the following formula in the free acid form,

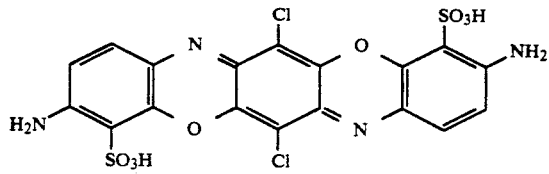

and cyanuric chloride (18 parts) in water (1500 parts) was stirred to complete the reaction at 0° to 30° C., while keeping the pH within a range of 5 to 8 using sodium carbonate. To the reaction mixture was added taurine (13 parts), and the mixture was stirred to complete the reaction at 10° to 50° C. and a pH ranging from 4 to 7. 1-aminobenzene-3-β-sulfatoethylsulfone (28 parts) was then added to the reaction mixture, and the resulting mixture was stirred to complete the reaction at 30° to 80° C. and a pH ranging from 4 to 7, thereby obtaining an intermediate dioxazine compound of the following formula in the free acid form.

was also exchanged same intermediate dioxazine compound as above was obtained.

A mixture of the intermediate obtained above (103 parts) and cyanuric chloride (18 parts) in water (1500 parts) was stirred to complete the reaction at 0° to 30° C., while keeping the pH within a range of 5 to 8. To the reaction mixture was added taurine (13 parts), and the mixture was stirred to complete the reaction at 10° to 50° C. and a pH ranging from 4 to 7. Taurine (13 parts) was additionally added thereto, and the mixture was stirred to complete the reaction at 30° to 80° C. and a pH ranging from 4 to 7, thereby obtaining the same asymmetric dioxazine compound as in Example 155.

EXAMPLE 165

A mixture of a dioxazine compound (55 parts) having the following formula in the free acid form,

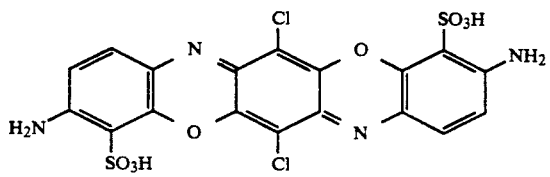

and cyanuric chloride (18 parts) in water (1500 parts) was stirred to complete the reaction at 0° to 30° C., while keeping the pH within a range of 5 to 8. To the reaction mixture was added taurine (13 parts) and the mixture was stirred to complete the reaction at 10° to 50° C. and a pH ranging from 4 to 7. Thereafter, cyanuric chloride (18 parts) was added thereto, and the mixture was stirred to complete the reaction at 0° to 30° C. and a pH ranging from 5 to 8. Further, 1-aminobenzene-3-β-sulfatoethylsulfone (28 parts) was added thereto, and the mixture was stirred to complete the reaction at 10° to 50° C. and a pH ranging from 4 to 7, thereby obtaining an intermediate dioxazine compound of the following formula in the free acid form.

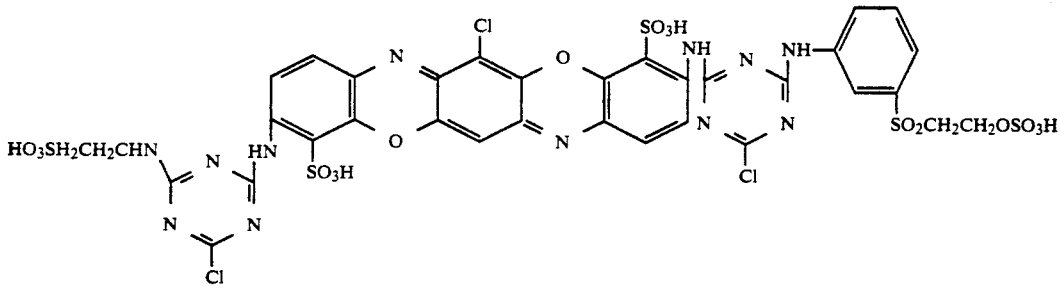

following formula in the free acid form.

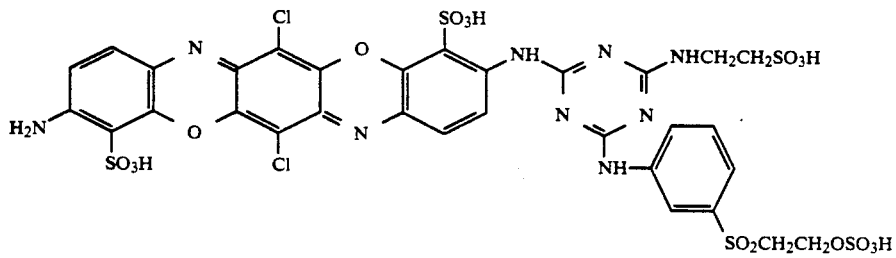

In the above procedure, the reaction order of the 1-aminobenzene-3-β-sulfatoethylsulfone and taurine The above procedure was repeated, except that the reaction order of the 1-aminobenzene-3-β-sulfatoethylsulfone and taurine was exchanged, thereby also obtaining the same intermediate dioxazine compound as above.

A mixture of the intermediate (118 parts) obtained above and taurine (26 parts) in water (1500 parts) was stirred to complete the reaction at 30° to 80° C. and pH ranging from 4 to 7, thereby obtaining a compound, which was found to be the same as the asymmetric dioxazine compound obtained in Example 155.

EXAMPLE 166

Example 155 was repeated, except that 1-N-ethylaminobenzene-3-$\beta$-sulfatoethylsulfone was used in place of the taurine used in Example 155 in an amount equimolar thereto, thereby obtaining an asymmetric dioxazine compound of the following formula in the free acid form.

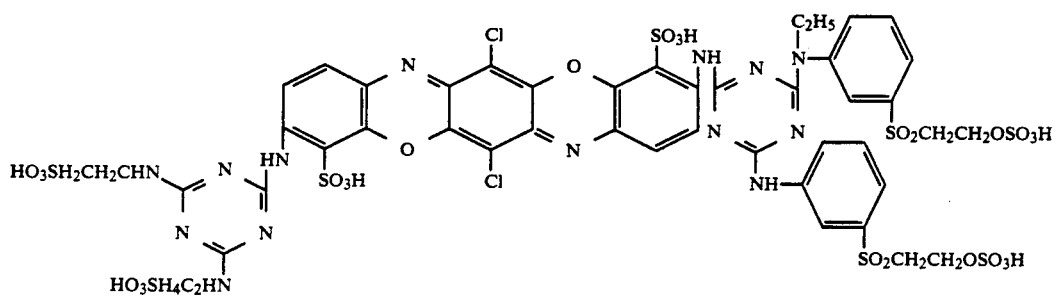

EXAMPLE 167

Example 155 was repeated, except that the amines described below were used in place of the taurine used in Example 155 in amounts equimolar thereto, obtaining corresponding asymmetric dioxazine compounds.

(1) H$_2$N—C$_6$H$_4$—SO$_2$C$_2$H$_4$OSO$_3$H (2) H$_2$N—C$_6$H$_4$—SO$_2$CH=CH$_2$ (3) H$_2$N—C$_6$H$_3$(OCH$_3$)—SO$_2$C$_2$H$_4$OSO$_3$H (4) H$_2$N—C$_6$H$_4$—SO$_2$C$_2$H$_4$OSO$_3$H

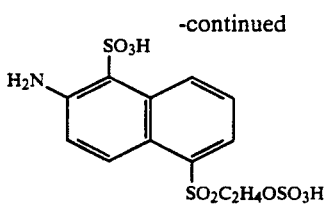
(5)

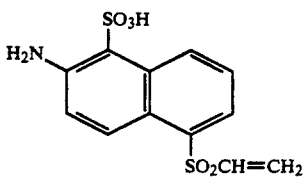
(6)

H$_2$N—(CH$_2$)$_2$OC$_2$H$_4$SO$_2$C$_2$H$_4$Cl  (7)

H$_2$N—(CH$_2$)$_2$OC$_2$H$_4$SO$_2$CH=CH$_2$  (8)

EXAMPLE 168

Example 159 was repeated, except that the amines (1) to (8) described in Example 167 were used in place of the taurine used in Example 159 in amounts equimolar thereto, thereby obtaining corresponding asymmetric dioxazine compounds.

EXAMPLE 169

Each of the asymmetric dioxazine compounds obtained in Examples 166 to 168 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a reddish blue color superior in fastness properties, particularly chlorine fastness. The dioxazine compounds were also found to be superior in build-up properties.

EXAMPLE 170

Using the asymmetric dioxazine compounds used in Examples 158, 162 and 169, color pastes having the following composition were prepared.

| | |
|---|---|
| Asymmetric dioxazine compound | 5 parts |
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloths were printed with the color pastes having the above composition, pre-dried and steamed at 100° C. for 5 minutes. The treated cloths were washed with hot water, soaped, again washed with hot water and then dried. Thus, printed products of a blue color excellent in fastness properties, particularly chlorine fastness were obtained.

EXAMPLE 171

A mixture of an intermediate dioxazine compound (59 parts) having the following formula in the free acid form,

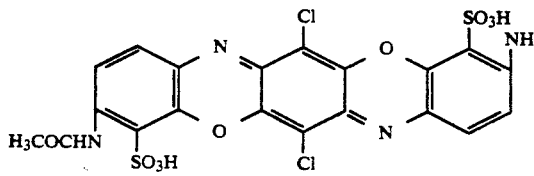

and cyanuric chloride (18 parts) in water (1500 parts) was stirred to complete the reaction at 0° to 30° C., while keeping the pH within a range of 5 to 8. Sulfanilic acid (17 parts) was added thereto, and the mixture was stirred to complete the reaction at 10° to 50° C. and a pH ranging from 5 to 8. Further, 1-aminobenzene-3-β-sulfatoethylsulfone (28 parts) was added thereto, and the mixture was stirred to complete the reaction at 30° to 80° C. and a pH ranging from 3 to 6, thereby obtaining a desired asymmetric dioxazine compound of the following formula in the free acid form.

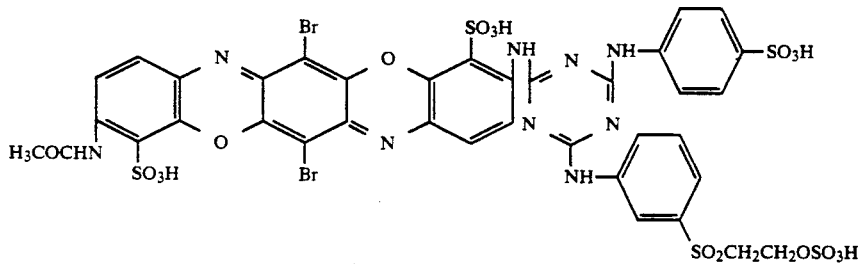

λmax 585 nm

The above intermediate dioxazine compound had been prepared by stirring a mixture of a dioxazine compound (55 parts) of the following formula in the free acid form,

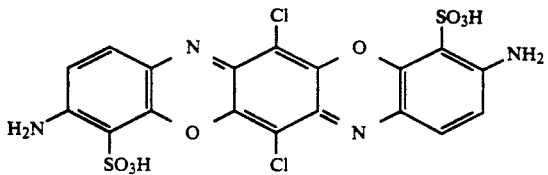

and acetic anhydride (10 parts) in water (500 parts) at 10° to 50° C. and a pH ranging from 2 to 7.

EXAMPLE 172

Example 171 was repeated, except that an intermediate dioxazine compound of the following formula in the free acid form,

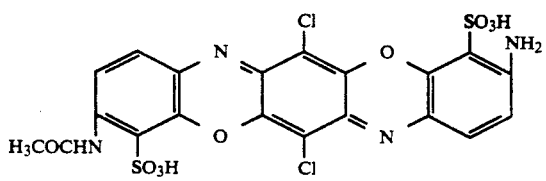

was used in place of the intermediate dioxazine compound used in Example 171 in an amount equimolar thereto, thereby obtaining an asymmetric dioxazine compound of the following formula in the free acid form,

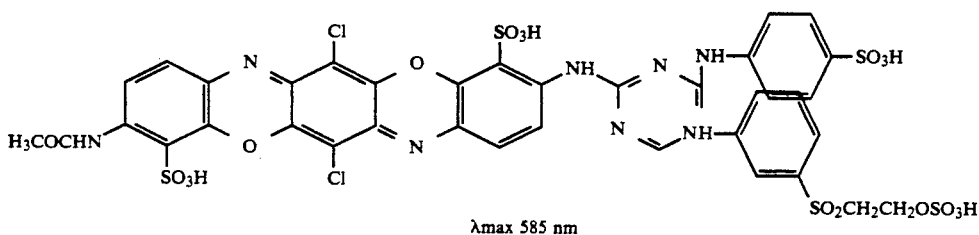

λmax 585 nm

The above intermediate dioxazine compound had been prepared in the same manner as in Example 171 except that a dioxazine compound of the following formula in the free acid form,

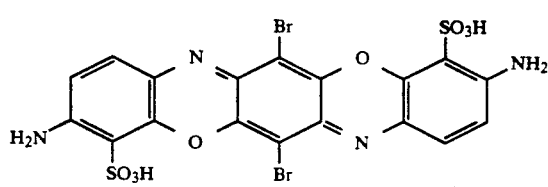

in place of the dioxazine compound used was used in Example 171 in an amount equimolar thereto.

EXAMPLE 173

Each of the asymmetric dioxazine compounds obtained in Examples 171 and 172 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a reddish blue color superior in fastness properties, particularly chlorine fastness. The dioxazine compounds were also found to be superior in build-up properties.

EXAMPLES 174 TO 285

Example 171 was repeated, except that the intermediate dioxazine compounds and amines as described in the following table were used in place of the intermediate dioxazine compound and 1-aminobenzene-3-β-sulfatoethylsulfone used in Example 171, respectively, in respective amounts equimolar thereto, thereby obtaining corresponding asymmetric dioxazine compounds.

TABLE

| Example No. | Intermediate dioxazine compound | Amine | Color on cotton |
|---|---|---|---|
| 174 | [dioxazine with H₃COCHN, SO₃H, Cl, O, N, NH₂, SO₃H substituents] | H₂N–C₆H₄–SO₂C₂H₄OSO₃H | Reddish blue |
| 175 | " | H₂N–C₆H₃(OCH₃)–SO₂C₂H₄OSO₃H | " |
| 176 | " | H₂N–naphthyl–SO₂C₂H₄SO₃H (HO₃SOC₂H₄SO₂) | " |
| 177 | " | H₂N–C₆H₃(OCH₃)–SO₂C₂H₄OSO₃H | " |
| 178 | [dioxazine analogous structure] | H₂N–C₆H₃(SO₃H)–SO₂C₂H₄OSO₃H | Reddish blue |
| 179 | " | H₂N–naphthyl(SO₃H)–SO₂C₂H₄OSO₃H | " |

TABLE-continued
| Example No. | Intermediate dioxazine compound | Amine | Color on cotton |
|---|---|---|---|
| 180 | " | 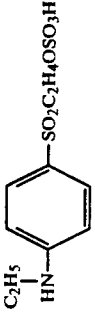 | " |
| 181 | " | 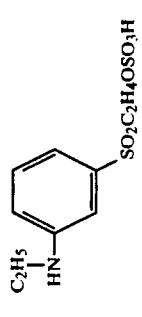 | " |
| 182 | " | 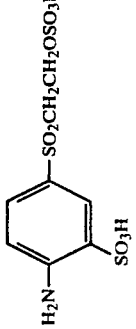 | " |
| 183 | 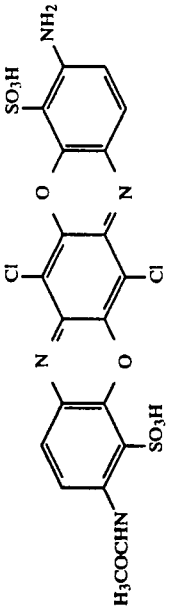 | 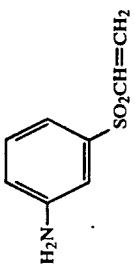 | Reddish blue |
| 184 | " | 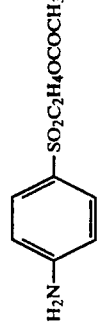 | " |
| 185 | " | 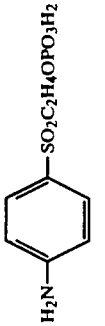 | " |
| 186 | " | 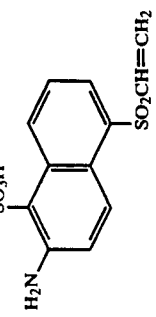 | " |

TABLE-continued

| Example No. | Intermediate dioxazine compound | Amine | Color on cotton |
|---|---|---|---|
| 187 | (same as above) | $H_2N-(CH_2)_2OC_2H_4SO_2C_2H_4Cl$ | " |
| 188 | (dioxazine with SO₃H, NH₂, Cl, H₃COCHN, SO₃H substituents) | $H_2N-(CH_2)_2OC_2H_4SO_2CH=CH_2$ | Reddish blue |
| 189 | " | $H_2N-(CH_2)_3OC_2H_4SO_2CH=CH_2$ | " |
| 190 | (dioxazine with SO₃H, NH₂, Cl, H₃CH₂COCHN, SO₃H substituents) | 4-($SO_2C_2H_4OSO_3H$)aniline | " |
| 191 | " | 2-methoxy-5-amino-phenyl-$SO_2C_2H_4OSO_3H$ | " |
| 192 | " | 6-amino-2-($HO_3SOC_2H_4SO_2$)naphthalene | " |
| 193 | (dioxazine with SO₃H, NH₂, Cl, H₃CH₂COCHN, SO₃H substituents) | 4-methoxy-3-amino-phenyl-$SO_2C_2H_4OSO_3H$ | Reddish blue |

TABLE-continued

| Example No. | Intermediate dioxazine compound | Amine | Color on cotton |
|---|---|---|---|
| 194 | " | 2-amino-4-(SO₂C₂H₄OSO₃H)-1-(SO₃H)-benzene (H₂N, SO₃H, SO₂C₂H₄OSO₃H substituted benzene) | " |
| 195 | " | 2-amino-5,8-disubstituted naphthalene with SO₃H and SO₂C₂H₄OSO₃H | " |
| 196 | " | 4-(N-ethylamino)-1-(SO₂C₂H₄OSO₃H)-benzene | " |
| 197 | " | 3-(N-ethylamino)-1-(SO₂C₂H₄OSO₃H)-benzene | Reddish blue |
| 198 | " | 2-amino-4-(SO₂CH₂CH₂OSO₃H)-1-(SO₃H)-benzene | " |
| 199 | " | 3-amino-1-(SO₂CH=CH₂)-benzene | " |

Intermediate dioxazine compound (shown in structure): dichloro-dioxazine ring system with two benzene substituents — one bearing SO₃H and NH₂ groups (upper), and one bearing SO₃H and NHCOCH₂CH₃ (H₃CH₂COCHN) groups (lower).

TABLE-continued

| Example No. | Intermediate dioxazine compound | Amine | Color on cotton |
|---|---|---|---|
| 200 | (same as above) | 4-H2N-C6H4-SO2C2H4OCOCH3 | " |
| 201 | " | 4-H2N-C6H4-SO2C2H4OPO3H2 | " |
| 202 | (dioxazine with SO3H, NH2, Cl, OCHN-phenyl, H3CH2COCHN substituents) | 1-amino-5-(SO2CH=CH2)-naphthalene-with SO3H | Reddish blue |
| 203 | " | H2N—(CH2)2OC2H4SO2C2H4Cl | " |
| 204 | " | H2N—(CH2)2OC2H4SO2CH=CH2 | " |
| 205 | " | H2N—(CH2)3OC2H4SO2CH=CH2 | " |
| 206 | (dioxazine with SO3H, NH2, Cl, OCHN-phenyl) | 4-H2N-C6H4-SO2C2H4OSO3H | " |
| 207 | " | 2-OCH3-4-H2N-C6H3-SO2C2H4OSO3H | Reddish blue |
| 208 | " | 6-H2N-2-(HO3SOC2H4SO2)-naphthalene | " |

TABLE-continued

| Example No. | Intermediate dioxazine compound | Amine | Color on cotton |
|---|---|---|---|
| 209 | " | 2-amino-4-(β-sulfatoethylsulfonyl)-1-methoxybenzene | " |
| 210 | " | 2-amino-4-(β-sulfatoethylsulfonyl)-1-sulfobenzene | " |
| 211 | 3,10-bis(phenylamino)-type dioxazine (see structure) | 2-amino-5-(β-sulfatoethylsulfonyl)-1-sulfonaphthalene | Reddish blue |
| 212 | " | 4-(β-sulfatoethylsulfonyl)-N-ethylaniline | " |
| 213 | " | 3-(β-sulfatoethylsulfonyl)-N-ethylaniline | " |
| 214 | " | 2-amino-4-(β-sulfatoethylsulfonyl)-1-sulfobenzene | " |

TABLE-continued

| Example No. | Intermediate dioxazine compound | Amine | Color on cotton |
|---|---|---|---|
| 215 | " | 3-aminophenyl-SO₂CH=CH₂ | " |
| 216 | Dioxazine structure A | 4-aminophenyl-SO₂C₂H₄OCOCH₃ | Reddish blue |
| 217 | " | 4-aminophenyl-SO₂C₂H₄OPO₃H₂ | " |
| 218 | " | 1-SO₃H, 5-SO₂CH=CH₂, 2-amino-naphthalene | " |
| 219 | " | H₂N—(CH₂)₂OC₂H₄SO₂C₂H₄Cl | " |
| 220 | " | H₂N—(CH₂)₂OC₂H₄SO₂CH=CH₂ | " |
| 221 | Dioxazine structure B | H₂N—(CH₂)₃OC₂H₄SO₂CH=CH₂ | Reddish blue |

Intermediate dioxazine compound (Examples 216–220): triphendioxazine bearing two SO₃H groups, two Cl substituents, with one side carrying an NH₂ and SO₃H-substituted phenyl, and the other side carrying a phenyl-NHCO— and SO₃H-substituted phenyl.

Intermediate dioxazine compound (Example 221): analogous triphendioxazine structure with NH₂, SO₃H, Cl, Cl, SO₃H, NHCO-phenyl substituents.

TABLE-continued

| Example No. | Intermediate dioxazine compound | Amine | Color on cotton |
|---|---|---|---|
| 222 | [dioxazine with H₃CO₂SHN, SO₃H, Cl substituents and NH₂, SO₃H] | 4-H₂N-C₆H₄-SO₂C₂H₄OSO₃H | " |
| 223 | " | 4-H₂N-2-OCH₃-C₆H₃-SO₂C₂H₄OSO₃H | " |
| 224 | " | 6-H₂N-naphthyl-2-SO₂C₂H₄OSO₃H (with HO₃S) | " |
| 225 | [dioxazine, same core] | 4-H₂N-2-OCH₃-C₆H₃-SO₂C₂H₄OSO₃H | Reddish blue |
| 226 | " | 4-H₂N-2-SO₃H-C₆H₃-SO₂C₂H₄OSO₃H | " |
| 227 | " | naphthyl (H₂N, SO₃H, SO₂C₂H₄OSO₃H) | " |

TABLE-continued

| Example No. | Intermediate dioxazine compound | Amine | Color on cotton |
|---|---|---|---|
| 228 | " | 4-(C₂H₅)HN-C₆H₄-SO₂C₂H₄OSO₃H | " |
| 229 | " | 3-(C₂H₅)HN-C₆H₄-SO₂C₂H₄OSO₃H | Reddish blue |
| 230 | " | 2-H₂N-5-(SO₂CH₂CH₂OSO₃H)-C₆H₃-SO₃H | " |
| 231 | " | 3-H₂N-C₆H₄-SO₂CH=CH₂ | " |
| 232 | " | 4-H₂N-C₆H₄-SO₂C₂H₄OCOCH₃ | " |
| 233 | " | 4-H₂N-C₆H₄-SO₂C₂H₄OPO₃H₂ | " |
| 234 | (dioxazine structure with H₃CO₂SHN, SO₃H, Cl groups) | 1-SO₃H-2-H₂N-naphthalene-5-SO₂CH=CH₂ | Reddish blue |

| Example No. | Intermediate dioxazine compound | Amine | Color on cotton |
|---|---|---|---|
| 235 | " | $H_2N-(CH_2)_2OC_2H_4SO_2C_2H_4Cl$ | " |
| 236 | " | $H_2N-(CH_2)_2OC_2H_4SO_2CH=CH_2$ | " |
| 237 | " | $H_2N-(CH_2)_3OC_2H_4SO_2CH=CH_2$ | " |
| 238 | (dioxazine structure with SO₃H, NH₂, Cl, O, N, O₂SNH-C₆H₄-CH₃ groups) | 4-aminophenyl-$SO_2C_2H_4OSO_3H$ | " |
| 239 | (same dioxazine structure) | 4-amino-2-methoxyphenyl-$SO_2C_2H_4OSO_3H$ | Reddish blue |
| 240 | " | 6-amino-2-($HO_3SOC_2H_4SO_2$)-naphthalene | " |
| 241 | " | 3-amino-4-methoxyphenyl-$SO_2C_2H_4OSO_3H$ | " |
| 242 | " | 3-amino-4-sulfophenyl-$SO_2C_2H_4OSO_3H$ | " |

TABLE-continued

| Example No. | Intermediate dioxazine compound | Amine | Color on cotton |
|---|---|---|---|
| 243 | [dioxazine with H3C-phenyl-NHSO2 and SO3H, NH2 substituents] | 6-amino-1,5-naphthalenedisulfonic acid derivative (H2N, SO3H, SO2C2H4OSO3H) | Reddish blue |
| 244 |  " | 4-(C2H5)HN-phenyl-SO2C2H4OSO3H | " |
| 245 | " | 3-(C2H5)HN-phenyl-SO2C2H4OSO3H | " |
| 246 | " | 2-H2N-5-SO2CH2CH2OSO3H-phenyl-SO3H | " |
| 247 | " | 3-H2N-phenyl-SO2CH=CH2 | " |
| 248 | [dioxazine with H3C-phenyl-NHSO2 and SO3H, NH2 substituents] | 4-H2N-phenyl-SO2C2H4OCOCH3 | Reddish blue |

TABLE-continued

| Example No. | Intermediate dioxazine compound | Amine | Color on cotton |
|---|---|---|---|
| 249 | " | H₂N–C₆H₄–SO₂C₂H₄OPO₃H₂ | " |
| 250 | " | 2-amino-1-SO₃H-5-(SO₂CH=CH₂)-naphthalene | " |
| 251 | " | H₂N–(CH₂)₂OC₂H₄SO₂C₂H₄Cl | " |
| 252 | " | H₂N–(CH₂)₂OC₂H₄SO₂CH=CH₂ | " |
| 253 | " | H₂N–(CH₂)₃OC₂H₄SO₂CH=CH₂ | " |
| 254 | (dioxazine intermediate: bis-aryl dioxazine with SO₃H, Cl, and HOOCCH₂CH₂COCHN substituents) | H₂N–C₆H₄–SO₂C₂H₄OSO₃H | Reddish blue |
| 255 | " | 4-OCH₃-2-(SO₂C₂H₄OSO₃H)-aniline | " |
| 256 | " | 6-amino-2-(HO₃SOC₂H₄SO₂)-naphthalene | " |
| 257 | " | 4-OCH₃-2-(SO₂C₂H₄OSO₃H)-aniline | " |

TABLE-continued

| Example No. | Intermediate dioxazine compound | Amine | Color on cotton |
|---|---|---|---|
| 258 | ″ | 2-amino-4-($SO_2C_2H_4OSO_3H$)-phenyl-$SO_3H$ | ″ |
| 259 | HOOCH$_2$CH$_2$COCHN-substituted dichloro-dioxazine with SO$_3$H and HN$_2$ groups | 1-amino-5-($SO_2C_2H_4OSO_3H$)-naphthyl-$SO_3H$ | Reddish blue |
| 260 | ″ | 4-($SO_2C_2H_4OSO_3H$)-phenyl-NH-$C_2H_5$ | ″ |
| 261 | ″ | 3-($SO_2C_2H_4OSO_3H$)-phenyl-NH-$C_2H_5$ | ″ |
| 262 | ″ | 2-amino-4-($SO_2CH_2CH_2OSO_3H$)-phenyl-$SO_3H$ | ″ |
| 263 | ″ | 3-amino-phenyl-$SO_2CH=CH_2$ | ″ |

TABLE-continued

| Example No. | Intermediate dioxazine compound | Amine | Color on cotton |
|---|---|---|---|
| 264 | [structure with HOOCH₂CH₂COCHN, SO₃H, Cl, O, N, HN₂ groups] | H₂N—C₆H₄—SO₂C₂H₄OCOCH₃ | Reddish blue |
| 265 | " | H₂N—C₆H₄—SO₂C₂H₄OPO₃H₂ | " |
| 266 | " | 2-amino-5,8-naphthalene with SO₃H and SO₂CH=CH₂ | " |
| 267 | " | H₂N—(CH₂)₂OC₂H₄SO₂C₂H₄Cl | " |
| 268 | " | H₂N—(CH₂)₂OC₂H₄SO₂CH=CH₂ | " |
| 269 | " | H₂N—(CH₂)₃OC₂H₄SO₂CH=CH₂ | " |
| 270 | [structure with HOOC—C₆H₄—OCHN, SO₃H, O, Cl, N, HN₂ groups] | H₂N—C₆H₄—SO₂C₂H₄OSO₃H | Reddish blue |
| 271 | " | H₂N—C₆H₃(OCH₃)—SO₂C₂H₄OSO₃H | " |
| 272 | " | H₂N-naphthalene-SO₂C₂H₄SO₃H with HO₃SOC₂H₄SO₂ | " |

TABLE-continued

| Example No. | Intermediate dioxazine compound | Amine | Color on cotton |
|---|---|---|---|
| 273 | | 2-amino-4-(β-sulfatoethylsulfonyl)-anisole (H₂N–, OCH₃, SO₂C₂H₄OSO₃H) | " |
| 274 | " | 2-amino-4-(β-sulfatoethylsulfonyl)benzenesulfonic acid (H₂N–, SO₃H, SO₂C₂H₄OSO₃H) | " |
| 275 | dioxazine structure with two SO₃H groups, Cl substituents, and a p-carboxyphenoxy-amido group (HOOC–C₆H₄–O–CHN–) | 2-amino-5-(β-sulfatoethylsulfonyl)naphthalene-1-sulfonic acid | Reddish blue |
| 276 | " | N-ethyl-4-(β-sulfatoethylsulfonyl)aniline (C₂H₅–HN–, SO₂C₂H₄OSO₃H) | " |
| 277 | " | N-ethyl-3-(β-sulfatoethylsulfonyl)aniline (C₂H₅–HN–, SO₂C₂H₄OSO₃H) | " |
| 278 | " | 2-amino-4-(β-sulfatoethylsulfonyl)benzenesulfonic acid with propyl sulfone (H₂N–, SO₃H, SO₂CH₂CH₂OSO₃H) | " |

TABLE-continued

| Example No. | Intermediate dioxazine compound | Amine | Color on cotton |
|---|---|---|---|
| 279 | " | (3-aminophenyl)-SO$_2$CH=CH$_2$ | " |
| 280 | [structure: dioxazine with SO$_3$H, HN-CHO-phenyl-COOH substituents] | (4-aminophenyl)-SO$_2$C$_2$H$_4$OCOCH$_3$ | Reddish blue |
| 281 | " | (4-aminophenyl)-SO$_2$C$_2$H$_4$OPO$_3$H$_2$ | " |
| 282 | " | [2-amino-5-(vinylsulfonyl)-1-naphthalenesulfonic acid] | " |
| 283 | " | H$_2$N—(CH$_2$)$_2$OC$_2$H$_4$SO$_2$C$_2$H$_4$Cl | " " |
| 284 | " | H$_2$N—(CH$_2$)$_2$OC$_2$H$_4$SO$_2$CH=CH$_2$ | " " |
| 285 | " | H$_2$N—(CH$_2$)$_3$OC$_2$H$_4$SO$_2$CH=CH$_2$ | " " |

EXAMPLE 286

Example 171 was repeated, except that an intermediate dioxazine compound of the following formula in the free acid form,

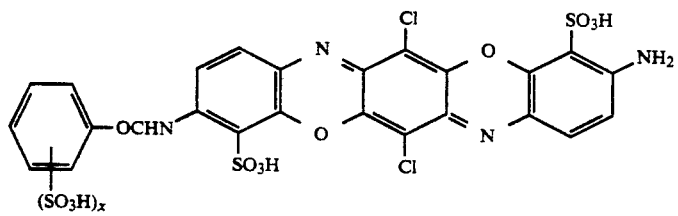

wherein x is a sulfonation degree of about 1.2, was used in place of the intermediate dioxazine compound used in Example 171 in an amount equimolar thereto, thereby obtaining an asymmetric dioxazine compound of the following formula in the free acid form,

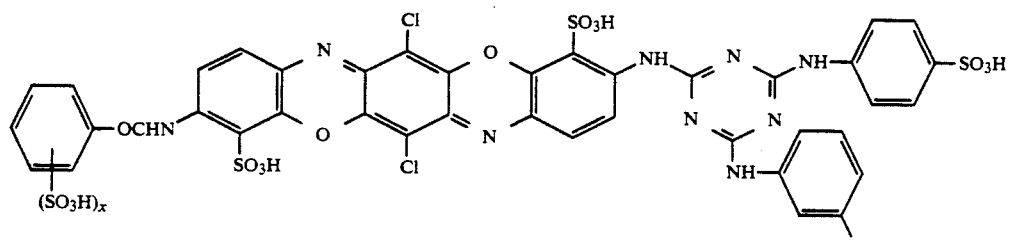

λmax 585 nm wherein x is as defined above.

The above intermediate dioxazine compound had been prepared by adding the same intermediate dioxazine compound (65 parts) used in Example 206 to 5 to 30% oleum (500 parts), stirring the mixture to complete the reaction at 20° to 70° C., pouring the reaction mixture into ice water and then salting it out.

EXAMPLES 287 TO 302

Example 286 was repeated, except that amines described in the following table were used in place of the 1-aminobenzene-3-β-sulfatoethylsulfone used in Example 286 in amounts equimolar thereto, thereby obtaining corresponding asymmetric dioxazine compounds.

TABLE

| Example No. | Amine | Color on cotton |
|---|---|---|
| 287 | H₂N–C₆H₄–SO₂C₂H₄OSO₃H | Reddish blue |
| 288 | H₂N–C₆H₃(OCH₃)–SO₂C₂H₄OSO₃H | Reddish blue |
| 289 | H₂N–naphthalene–SO₂C₂H₄OSO₃H (HO₃SOC₂H₄SO₂) | Reddish blue |
| 290 | SO₃H, H₂N, OCH₃, SO₂C₂H₄OSO₃H | Reddish blue |
| 291 | SO₃H, H₂N–C₆H₃–SO₂C₂H₄OSO₃H | Reddish blue |
| 292 | SO₃H, H₂N–naphthalene–SO₂C₂H₄OSO₃H | Reddish blue |
| 293 | C₂H₅–HN–C₆H₄–SO₂C₂H₄OSO₃H | Reddish blue |
| 294 | C₂H₅–HN–C₆H₄–SO₂C₂H₄OSO₃H | Reddish blue |
| 295 | H₂N–C₆H₃(SO₃H)–SO₂CH₂CH₂OSO₃H | Reddish blue |

TABLE-continued

| Example No. | Amine | Color on cotton |
|---|---|---|
| 296 | H$_2$N—⟨phenyl⟩—SO$_2$CH=CH$_2$ | Reddish blue |
| 297 | H$_2$N—⟨phenyl⟩—SO$_2$C$_2$H$_4$OCOCH$_3$ | Reddish blue |
| 298 | H$_2$N—⟨phenyl⟩—SO$_2$C$_2$H$_4$OPO$_3$H$_2$ | Reddish blue |
| 299 | H$_2$N—⟨naphthyl with SO$_3$H and SO$_2$CH=CH$_2$⟩ | Reddish blue |
| 300 | H$_2$N—(CH$_2$)$_2$OC$_2$H$_4$SO$_2$C$_2$H$_4$Cl | Reddish blue |
| 301 | H$_2$N—(CH$_2$)$_2$OC$_2$H$_4$SO$_2$CH=CH$_2$ | Reddish blue |
| 302 | H$_2$N—(CH$_2$)$_3$OC$_2$H$_4$SO$_2$CH=CH$_2$ | Reddish blue |

EXAMPLE 303

Example 171 was repeated, except that the amine compounds described below were used in place of the sulfanilic acid used in Example 171 in each amounts equimolar thereto, thereby obtaining the corresponding asymmetric dioxazine compounds.
(1) Orthanilic acid
(2) Methanilic acid
(3) 1-Aminonaphthalene-3,6-disulfonic acid
(4) 1-Aminonaphthalene-4,6,8-trisulfonic acid
(5) 2-Aminonaphthalene-4,8-disulfonic acid
(6) 2-Aminonaphthalene-3,6,8-trisulfonic acid
(7) Aniline-2,5-disulfonic acid
(8) Aniline
(9) m-Toluidine
(10) o-Anisidine
(11) Ammonia
(12) Ethylamine
(13) Ethanolamine
(14) β-Alanine
(15) Taurine
(16) N-Methyltaurine

EXAMPLE 304

Examples 174 to 302 were repeated, except that amine compounds (1) to (16) described in Example 303 were used in place of sulfanilic acid, thereby obtaining the corresponding asymmetric dioxazine compounds.

EXAMPLE 305

Each of the assymetric dioxazine compounds obtained in Examples 174 to 302 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a reddish blue color superior in fastness properties, particularly chlorine fastness. The dioxazine compounds were also found to be superior in build-up property.

EXAMPLE 306

Example 171 was repeated, except that the reaction order of the 1-aminobenzene-3-β-sulfatoethylsulfone and sulfanilic acid was exchanged. The same asymmetric dioxazine compound as obtained in Example 171 was obtained.

EXAMPLE 307

A mixture of a dioxazine compound (55 parts) having the following formula in the free acid form,

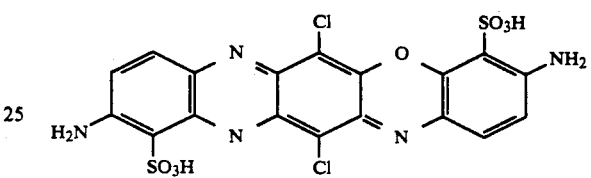

and cyanuric chloride (18 parts) in water (1500 parts) was stirred to complete the reaction at 0° to 30° C., while keeping the pH within a range of 5 to 8 using sodium carbonate. To the reaction mixture was added sulfanilic acid (17 parts), and the mixture was stirred to complete the reaction at 10° to 50° C. and a pH ranging from 5 to 8. Then, acetic anhydride (10 parts) was added thereto, and the mixture was stirred to complete the reaction at 10° to 50° C. and pH ranging from 2 to 7. Aminobenzene-3-β-sulfatoethylsulfone (28 parts) was then added thereto, and the mixture was further stirred to complete the reaction at 30° to 80° C. and a pH ranging from 3 to 6, thereby obtaining a compound, which was found to be the same as the asymmetric dioxazine compound obtained in Example 171.

EXAMPLE 308

Example 307 was repeated, except that the reaction order of the 1-aminobenzene-3-β-sulfatoethylsulfone and sulfanilic acid was exchanged. The same asymmetric dioxazine compound as in Example 307 was obtained.

EXAMPLE 309

A mixture of a dioxazine compound (55 parts) having the following formula in the free acid form,

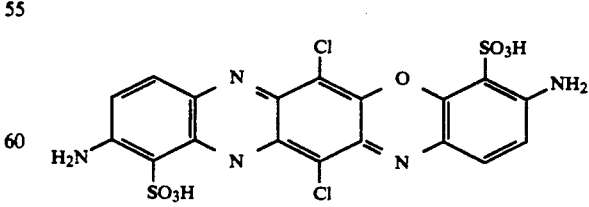

and cyanuric chloride (18 parts) in water (1500 parts) was stirred to complete the reaction at 0° to 30° C., while keeping the pH within a range of 5 to 8 using sodium carbonate. To the reaction mixture was added sulfanilic acid (17 parts), and the mixture was stirred to complete the reaction at 10° to 50° C. and a pH ranging from 5 to 8. 1-aminobenzene-3-β-sulfatoethylsulfone (28 parts) was then added thereto, and the mixture was stirred to complete the reaction at 30° to 80° C. and a pH ranging from 3 to 6. Further, acetic anhydride (10 parts) was added to the reaction mixture, and the mixture was stirred to complete the reaction at 10° to 50° C. and a pH ranging from 2 to 7, thereby obtaining a compound which was found to be the same as the asymmetric dioxazine compound obtained in Example 171.

EXAMPLE 310

Example 309 was repeated, except that the reaction order of the 1-aminobenzene-3-β-sulfatoethylsulfone and sulfanilic acid was exchanged, thereby obtained the same compound as obtained in Example 309.

EXAMPLE 311

Aniline-2,5-disulfonic acid (25.3 parts) was added to water (1500 parts) with neutralization using sodium carbonate to obtain a clear solution. Cyanuric chloride (18 parts) was added to the clear solution at 5° to 30° C., and the mixture was stirred to complete the reaction. An intermediate dioxazine compound (59 parts) which had been obtained in the same manner as in Example 171 was added to the above reaction mixture, and the mixture was stirred to complete the reaction, while neutralizing the hydrochloric acid produced with sodium carbonate. Further, 1-aminobenzene-3-β-sulfatoethylsulfone (28 parts) was added thereto, and the mixture was heated to 50° to 70° C., while keeping the pH within a range of 2 to 5, and stirred to complete the reaction, thereby obtaining a product which was found to be the same asymmetric dioxazine compound as obtained in Example 303(7).

EXAMPLE 312

A intermediate dioxazine compound (59 parts) which had been prepared as in Example 171 was dissolved in water (1500 parts), and cyanuric chloride (18 parts) was added thereto at 5° to 30° C. The mixture was stirred to complete the reaction, while keeping the pH within a range of 2 to 7 using sodium carbonate. 1-aminobenzene-3-β-sulfatoethylsulfone (28 parts) was then added thereto, and the mixture was stirred to complete the reaction at 10° to 50° C. and a pH ranging from 2 to 6. To the reaction mixture was added 1-N-ethylaminobenzene-3-β-sulfatoethylsulfone (31 parts), and the mixture was stirred to complete the reaction at 40° to 90° C., while keeping the pH within a range of 2 to 6, thereby obtaining an asymmetric dioxazine compound of the following formula in the free acid form.

EXAMPLE 313

Example 312 was repeated, except that the amines described below were used in place of the 1-N-ethylaminobenzene-3-β-sulfatoethylsulfone used in Example 312 in amounts equimolar thereto, thereby obtaining the corresponding asymmetric dioxazine compounds.

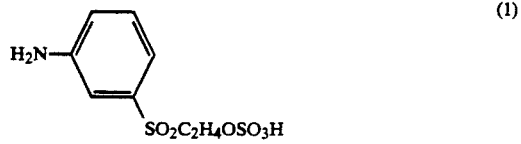

(1)

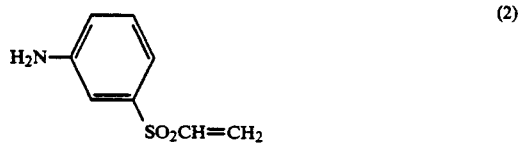

(2)

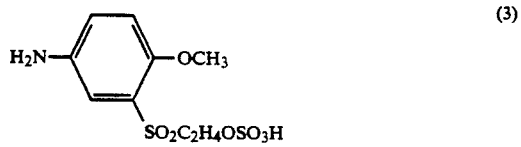

(3)

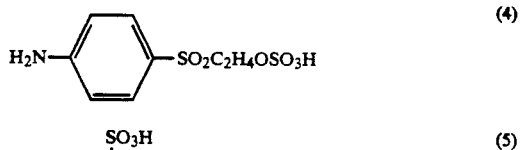

(4)

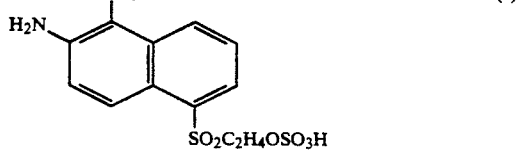

(5)

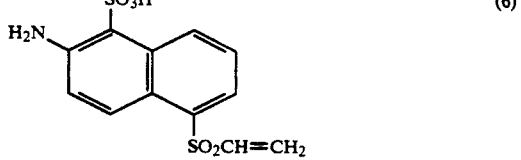

(6)

$H_2N-(CH_2)_2OC_2H_4SO_2C_2H_4Cl$ (7)

$H_2N-(CH_2)_2OC_2H_4SO_2CH=CH_2$ (8)

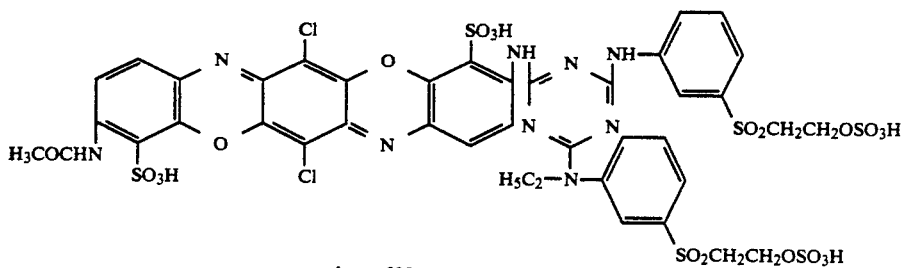

λmax 585 nm

EXAMPLE 314

Example 312 was repeated, except that the intermediate dioxazine compounds described in Examples 179 to 302 were used in place of that used in Example 312 in amounts equimolar thereto, thereby obtaining corresponding asymmetric dioxazine compounds.

EXAMPLE 315

Example 314 was repeated, except that amines (1) to (8) described in Example 313 were used in place of the 1-N-ethylaminobenzene-3-β-sulfatoethylsulfone used in Example 314 in amounts equimolar thereto, thereby obtaining corresponding asymmetric dioxazine compounds.

EXAMPLE 316

Each of the asymmetric dioxazine compounds obtained Examples 312 to 315 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 317

Using each of the asymmetric dioxazine compounds used in Examples 173, 305 and 316, color pastes of the composition described below were prepared.

| Asymmetric dioxazine compound | 5 parts |
|---|---|
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloths were printed with the color pastes having the above composition, prepdried and steamed at 100° C. for 5 minutes. The treated cloths were washed with hot water, soaped, again washed with hot water and then dried. Thus, there were obtained printed products of a blue color excellent in fastness properties, particularly chlorine fastness.

EXAMPLE 318

A mixture of a dioxazine compound (54.5 parts) having the following formula in the free acid form,

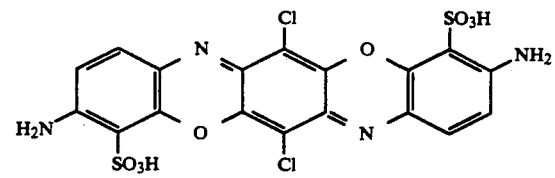

and cyanuric chloride (18.5 parts) in water (1500 parts) was stirred to complete the reaction at 5° to 30° C., while keeping the pH within a range of 3 to 7 using aqueous sodium carbonate solution. Thereafter, sodium chloride was added to the reaction mixture, and the crystals produced were separated on a filter. The cake was dissolved in water (1500 parts), and sulfanilic acid (17.3 parts) was added thereto. The mixture was stirred to complete the reaction at 30° to 50° C., while maintaining the pH within a range of 6 to 9. Sodium chloride was added thereto, and crystals produced were separated on a filter to obtain an intermediate dioxazine compound of the following formula in the free acid form.

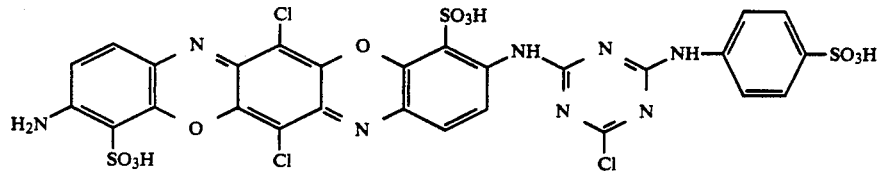

(λmax 585 nm)

The intermediate dioxazine compound (83 parts) was dissolved in water (1000 parts), and 1-aminobenzene-3-β-sulfatoethylsulfone (28.1 parts) was added thereto. The mixture was stirred to complete the reaction at 50° to 80° C., while maintaining the pH within a range of 2 to 5. Thereafter, potassium chloride was added thereto and then crystals produced were separated on a filter to obtain an asymmetric dioxazine compound of the following formula in the free acid form.

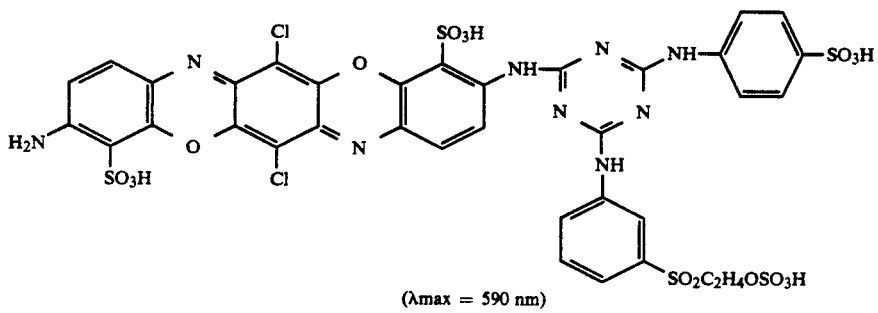

(λmax = 590 nm)

EXAMPLE 319

Example 318 was repeated, except that the amine compounds described below were used in place of the sulfanilic acid used in Example 318 in amounts equimolar thereto, thereby obtaining the corresponding asymmetric dioxazine compounds.

(1) Orthanilic acid
(2) Methanilic acid
(3) 1-Aminonaphthalene-3,6-disulfonic acid
(4) 1-Aminonaphthalene-4,6,8-trisulfonic acid
(5) 2-Aminonaphthalene-4,8-disulfonic acid
(6) 2-Aminonaphthalene-3,6,8-trisulfonic acid
(7) Aniline-2,5-disulfonic acid
(8) Aniline
(9) m-Toluidine
(10) o-Anisidine
(11) Ammonia
(12) Ethylamine
(13) Ethanolamine
(14) β-alanine
(15) Taurine
(16) N-Methyltaurine

EXAMPLE 320

Example 318 was repeated, except that the amines described below were used in place of the 1-aminobenzene-3-β-sulfatoethylsulfone used in Example 318 in amounts equimolar thereto, thereby obtaining the corresponding asymmetric dioxazine compounds.

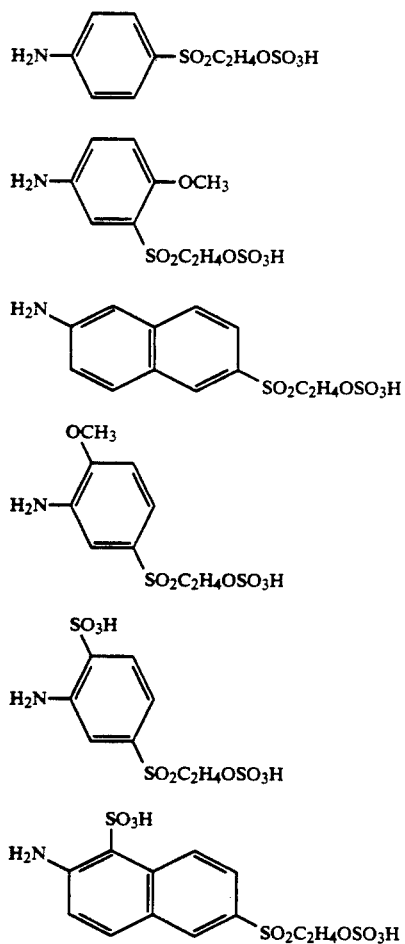

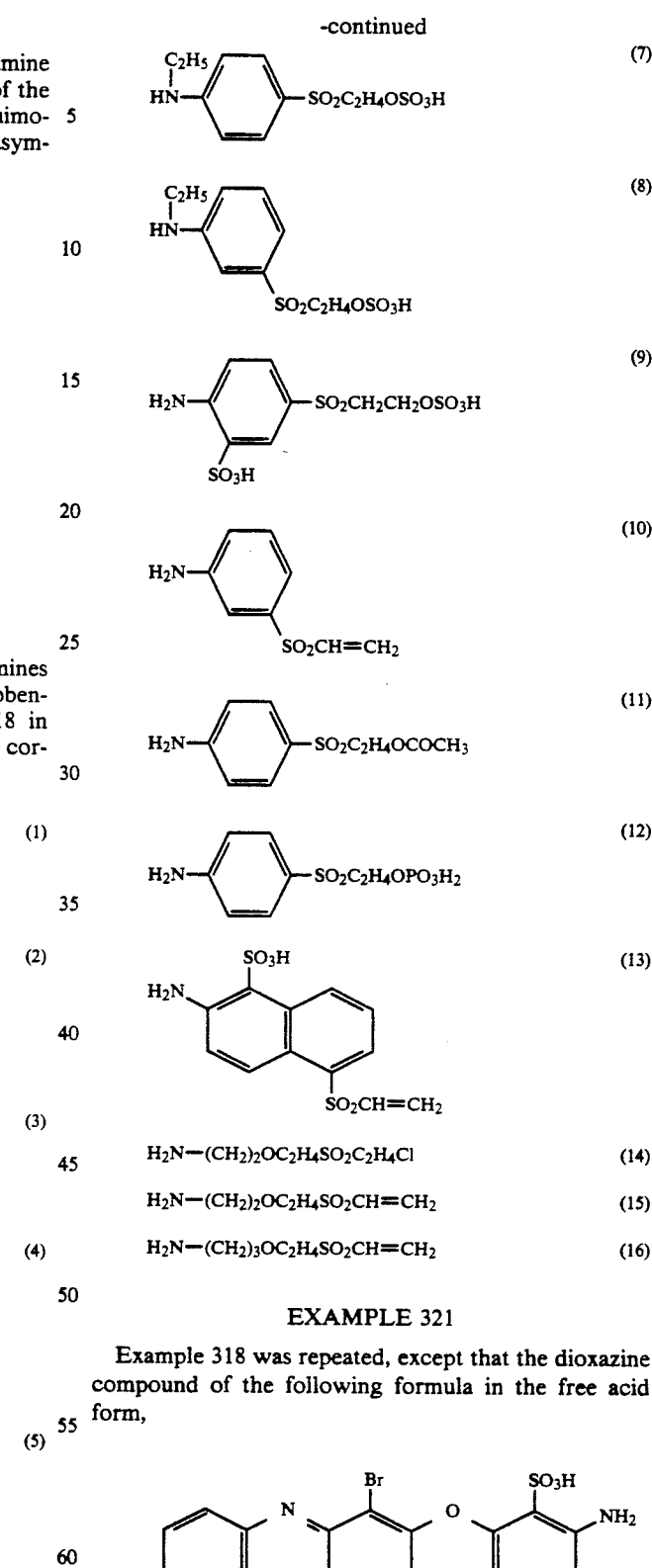

EXAMPLE 321

Example 318 was repeated, except that the dioxazine compound of the following formula in the free acid form,

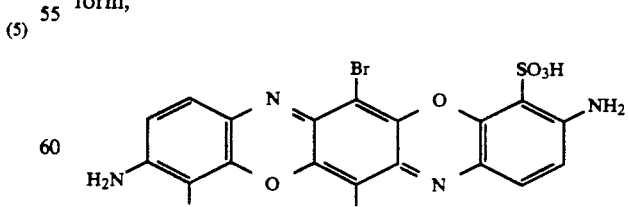

was used in place of the starting dioxazine compound used in Example 318 in an amount equimolar thereto, thereby obtaining a corresponding asymmetric dioxazine compound.

EXAMPLE 322

A mixture of 2-methoxy-4,6-dichloro-s-triazine (18 parts) and the same starting dioxazine compound as used in Example 318 was allowed to react at 30° to 50° C. and a pH ranging from 2 to 7, followed by being reacted with 1-aminobenzene-3-β-sulfatoethylsulfone (28.1 parts). The salting out of the reaction mixture gave an asymmetric dioxazine compound of the following formula in the free acid form.

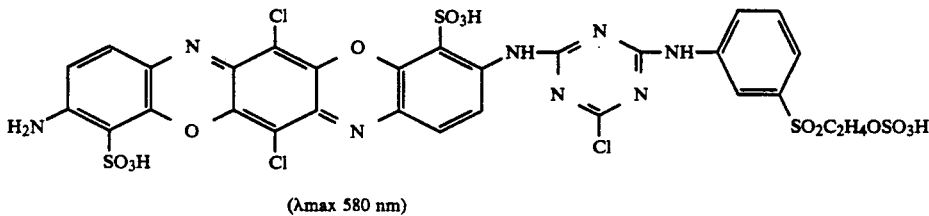

(λmax 580 nm)

EXAMPLE 323

Example 322 was repeated, except that 2-ethoxy-4,6-dichloro-s-triazine was used in place of the 2-methoxy-4,6-dichloro-s-triazine used in Example 322 in an amount equimolar thereto, thereby obtaining a corresponding dioxazine compound.

EXAMPLE 324

Example 322 was repeated, except that amines (1) to (16) described in Example 320 were used in place of the 1-aminobenzene-3-β-sulfatoethylsulfone used in Example 322 in amounts equimolar thereto, thereby obtaining the corresponding asymmetric dioxazine compounds.

EXAMPLE 325

The same starting dioxazine compound (54.5 parts) as in Example 318 was dissolved in water (1500 parts), and cyanuric chloride (18.5 parts) was added thereto. The mixture was stirred to complete the reaction at 5° to 30° C., while keeping the pH within a range of 3 to 7 using sodium carbonate. Thereafter, sodium chloride was added thereto, and crystals produced were separated on a filter. The cake was then dissolved in water (1500 parts), and 1-aminobenzene-3-β-sulfatoethylsulfone (28.1 parts) was added thereto. The mixture was stirred to complete the reaction at 10° to 50° C., while keeping the pH within a range of 2 to 6, thereby obtaining a corresponding dioxazine compound.

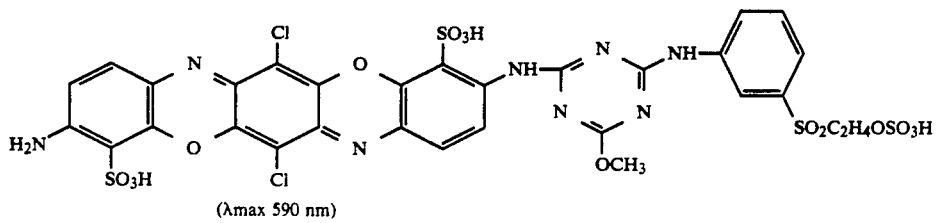

(λmax 590 nm)

EXAMPLE 326

Example 325 was repeated, except that the amines (1) to (16) described in Example 320 were used in place of the 1-aminobenzene-3-β-sulfatoethylsulfone used in Example 325 in amounts equimolar thereto, thereby obtaining the corresponding asymmetric dioxazine compounds.

EXAMPLE 327

A mixture of the asymmetric dioxazine compound (93.8 parts) which had been obtained in Example 325, and 1-aminobenzene-3-β-sulfatoethylsulfone (28.1 parts) in water (1500 parts) was stirred to complete the reaction at 40° to 90° C., while keeping the pH within a range of 2 to 6, thereby obtaining an asymmetric dioxazine compound of the following formula in the free acid form.

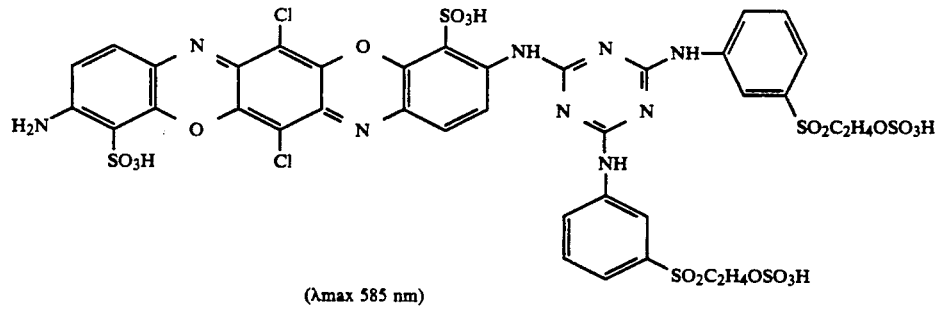

(λmax 585 nm)

EXAMPLE 328

Example 327 was repeated, except that the amines (1) to (16) described in Example 320 were used in place of the 1-aminobenzene-3-β-sulfatoethylsulfone used in Example 327 in amounts equimolar thereto, thereby obtaining the corresponding asymmetric dioxazine compounds.

EXAMPLE 329

Each of the asymmetric dioxazine compound obtained in Examples 318 to 328 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 330

A mixture of an intermediate dioxazine (83 parts) obtained in the same manner as in Example 318 and ethylenechlorohydrin (41 parts) in water (1000 parts) was stirred to complete the reaction at 60° to 90° C. while keeping the pH within a range of 6 to 9 using aqueous sodium hydroxide solution. Thereafter, potassium chloride was added to the reaction mixture, and the separation of the crystals produced gave an intermediate dioxazine compound of the following formula in the free acid form.

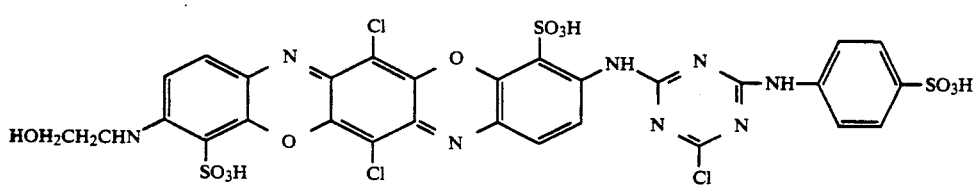

(λmax 590 nm)

A mixture of the above intermediate dioxazine compound (87.4 parts) and 1-aminobenzene-3-β-sulfatoethylsulfone (28.1 parts) in water (1000 parts) was stirred to complete the reaction at 50° to 80° C. while keeping the pH within a range of 2 to 5. Potassium chloride was added to the reaction mixture, and the separation of the crystals produced gave an asymmetric dioxazine compound of the following formula in the free acid form.

EXAMPLE 331

1,4-phenylenediamine-2-sulfonic acid (18.8 parts) and 2-aminoethyl-5-aminobenzenesulfonic acid (21.6 parts) were dissolved in water (1000 parts) and adjusted to a pH ranging from 5 to 7. Thereafter, chloranil (24.6 parts) was added thereto, and the mixture was stirred to complete the reaction at 15° to 30° C., while keeping the pH within a range of 5 to 8 using aqueous sodium carbonate solution. Thereafter, sodium chloride was added to the reaction mixture, and the crystals produced were separated on a filter and then dried at 80° C. to obtain a dianilide compound of the following formula in the free acid form.

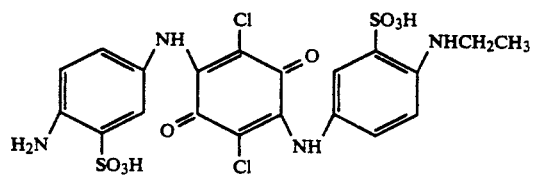

The dianilide compound (57.7 parts) was added to oleum of 5 to 30% strength containing potassium iodide (1.7 parts), and the mixture was stirred to complete the reaction at 5° to 25° C. Thereafter, the reaction mixture was poured into ice water to produce crystals, which were separated on a filter. The cake was dissolved in water (1500 parts) and adjusted to a pH ranging from 5 to 7, and sodium chloride was added thereto. The crystals produced were collected on a filter to obtain a dioxazine compound of the following formula in the free acid form.

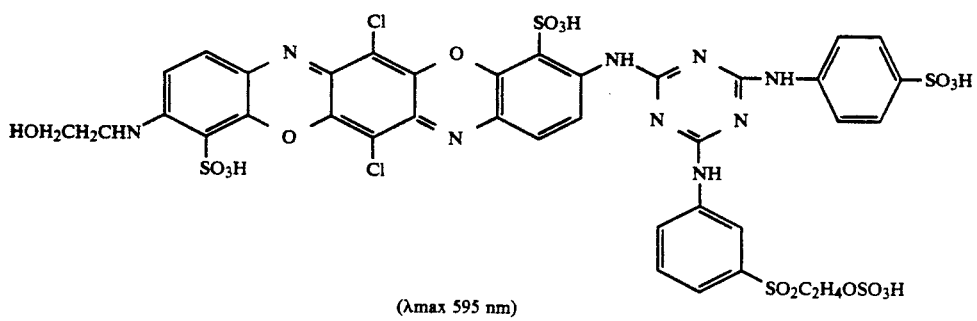

(λmax 595 nm)

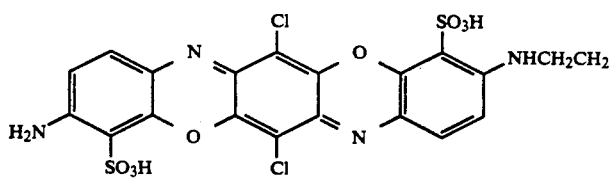

(λmax = 615 nm)

Aniline-2,5-disulfonic acid (25.3 parts) was added to water (100 parts), followed by the adjustment of the pH to 7, and cyanuric chloride (18.5 parts) was added thereto. The mixture was stirred to complete the reaction at 15° to 30° C., while keeping the pH within a range of 5 to 7 using aqueous sodium carbonate solution. The resulting reaction mixture was added to a solution of the above dioxazine compound (57.3 parts) in water (1500 parts), and the mixture was stirred to complete the reaction at 20° to 50° C., while keeping the pH within a range of 5 to 7 using aqueous sodium carbonate solution. Sodium chloride was added thereto to produce crystals, and the separation of the crystals gave an intermediate dioxazine compound of the following formula in the free acid form.

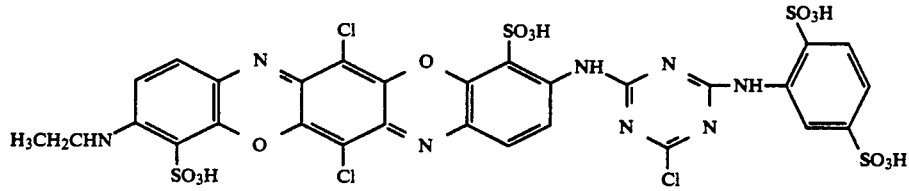

(λmax 590 nm)

A mixture of the intermediate dioxazine compound (93.8 parts) and 1-aminobenzene-3-β-sulfatoethylsulfone (28.1 parts) in water (1500 parts) was stirred to complete the reaction, while keeping the pH within a range of 2 to 5. Sodium chloride was added to the reaction mixture, and the crystals were collected on a filter to obtain an asymmetric dioxazine compound of the following formula in the free acid form.

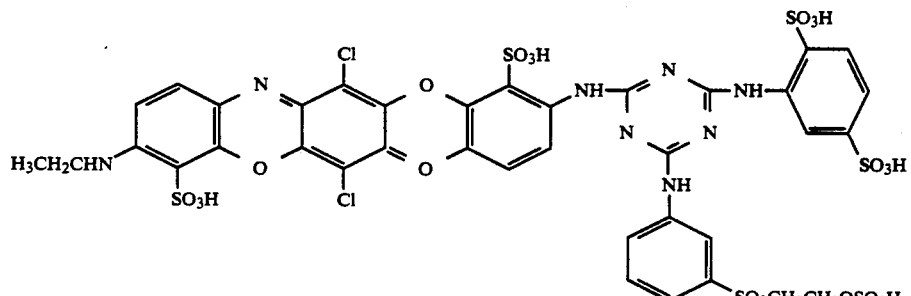

(λmax 595 nm)

EXAMPLE 332

A solution of 2-aminoethyl-5-aminobenzenesulfonic acid (43.2 parts) in water (1000 parts) was adjusted to a pH ranging from 5 to 7, and chloranil (24.6 parts) was added thereto. The mixture was stirred to complete the reaction at 15° to 40° C., while keeping the pH within a range of 5 to 8 using aqueous sodium carbonate solution. Sodium chloride was added to the reaction mixture, producing crystals, which were then collected on a filter and dried at 80° C. The product obtained was found to be a dianilide having the following formula.

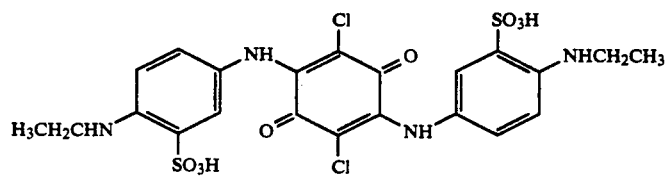

The dianilide (60.5 parts) was added to oleum of 5 to 30% strength (1800 parts) containing potassium iodide (1.7 parts), and the mixture was stirred to complete the reaction at 5° to 25° C. Thereafter the reaction mixture was poured into ice water to produce crystals, which were then collected on a filter. The cake was placed in water (1500 parts) and then adjusted to a pH ranging from 5 to 7 with aqueous sodium hydroxide solution. Salting out with sodium chloride gave a product, which was found to be the same dioxazine compound as that obtained in Example 331 (λmax 615 nm). Using the dioxazine compound, Example 321 was repeated to obtain an asymmetric dioxazine compound, which was the same as that obtained in Example 321.

EXAMPLE 333

Each of the asymmetric dioxazine compounds obtained in Examples 330 and 331 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 334

Example 330 was repeated, except that there each of the intermediate dioxazine compounds which had been prepared using amine compounds (1) to (16) described in Example 319 were used in place of the sulfanilic acid used in Example 318, thereby obtaining corresponding asymmetric dioxazine compounds.

EXAMPLE 335

Example 330 was repeated, except that amines (1) to (16) described in Example 320 were used in place of the 1-aminobenzene-3-β-sulfatoethylsulfone used in that Example, thereby obtaining corresponding asymmetric dioxazine compounds.

EXAMPLE 336

Example 331 was repeated, except that amine compounds (1) to (16) described in Example 319 were used in place of the aniline-2,5-disulfonic acid used in Example 331, thereby obtaining corresponding asymmetric dioxazine compounds.

EXAMPLE 337

Example 331 was repeated, except that amines (1) to (16) described in Example 320 were used in place of the 1-aminobenzene-3-β-sulfatoethylsulfone used in that Example, thereby obtaining corresponding asymmetric dioxazine compounds.

EXAMPLE 338

Using a dioxazine compound having the formula described below in place of the dioxazine compound used in Example 318, a process similar to that in Example 318 or 330 was repeated to obtain a corresponding asymmetric dioxazine compound.

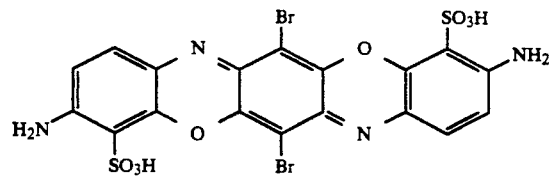

EXAMPLE 339

Example 331 was repeated, except that bromanil was used in place of the chloranil used in that Example, thereby obtaining a corresponding asymmetric dioxazine compound.

EXAMPLE 340

Example 332 was repeated, except that bromanil was used in place of the chloranil used in that Example, thereby obtaining a corresponding asymmetric dioxazine compound.

EXAMPLE 341

Each of the asymmetric dioxazine compounds obtained in Examples 334 to 340 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 342

2-Methoxy-4,6-dichloro-s-triazine (18 parts) and the dioxazine compound (57.3 parts) which had been prepared in Example 331 were allowed to react at 30° to 50° C. and a pH ranging from 2 to 7, followed by reacting with 1-aminobenzene-3-β-sulfatoethylsulfone. The salting out of the reaction mixture gave an asymmetric dioxazine compound of the following formula in the free acid form.

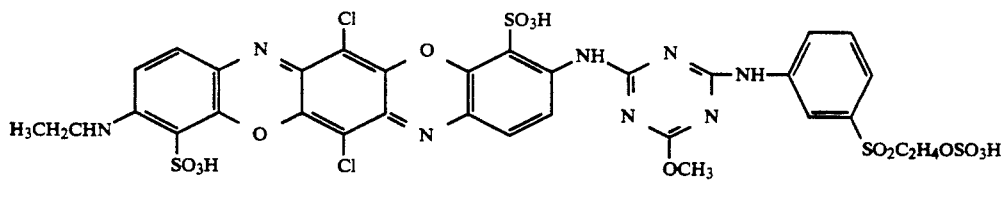

(λmax 595 nm)

EXAMPLE 343

Example 342 was repeated, except that 2-ethoxy-4,6-dichloro-s-triazine was used in place of the 2-methoxy-4,6-dichloro-s-triazine used in Example 342 in an amount equimolar thereto, thereby obtaining a corresponding asymmetric dioxazine compound.

EXAMPLE 344

Example 342 was repeated, except that amines (1) to (16) described in Example 320 were used in place of the 1-aminobenzene-3-β-sulfatoethylsulfone used in Exam-

EXAMPLE 345

The dioxazine compound (57.3 parts) which had been prepared in Example 331 was dissolved in water (1500 parts), and cyanuric chloride (18.5 parts) was added thereto. The mixture was stirred to complete the reaction at 5° to 30° C., while keeping the pH within a range of 3 to 7 with aqueous sodium carbonate solution. 1-aminobenzene-3-β-sulfatoethylsulfone (28.1 parts) was then added thereto. The reaction was continued at 10° to 50° C. and a pH ranging from 2 to 6 to obtain an asymmetric dioxazine compound of the following formula in the free acid form.

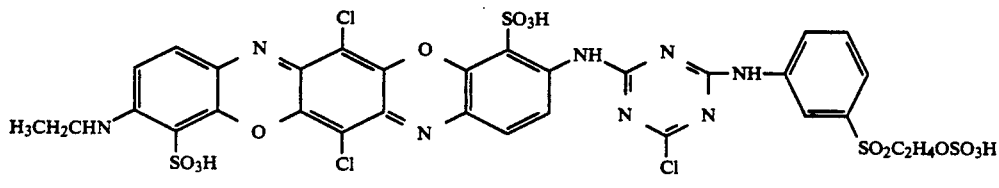

(λmax 585 nm)

EXAMPLE 346

Example 345 was repeated, except that amines (1) to (16) described in Example 320 were used in place of the 1-aminobenzene-3-β-sulfatoethylsulfone used in Example 345, thereby obtaining a corresponding asymmetric dioxazine compound.

EXAMPLE 347

The asymmetric dioxazine compound (96.6 parts) which had been produced Example 345 was dissolved in water (1500 parts), and 1-aminobenzene-3-β-sulfatoethylsulfone (28.1 parts) was added thereto. The reaction was continued at 40° to 90° C., while keeping the pH within a range of 2 to 9 using aqueous sodium carbonate solution, thereby obtaining an asymmetric dioxazine compound of the following formula in the free acid form.

EXAMPLE 348

Example 347 was repeated, except that amines (1) to (16) discribed in Example 320 were used in place of the 1-aminobenzene-3-β-sulfatoethylsulfone used in Example 347, thereby obtaining a corresponding asymmetric dioxazine compound.

EXAMPLE 349

Each of the asymmetric dioxazine compounds obtained in Examples 342 to 348 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 350

Using the asymmetric dioxazine compounds used in Examples 329, 333, 341 and 349, color pastes having the following composition were prepared.

| | |
|---|---|
| Asymmetric dioxazine compound | 5 parts |
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloths were printed with the color pastes having the above composition, pre-dried and steamed at 100° C. for 5 minutes. The treated cloths were washed with hot water, soaped, again washed with hot water and then dried. Thus, printed products of a blue color excellent in fastness properties,

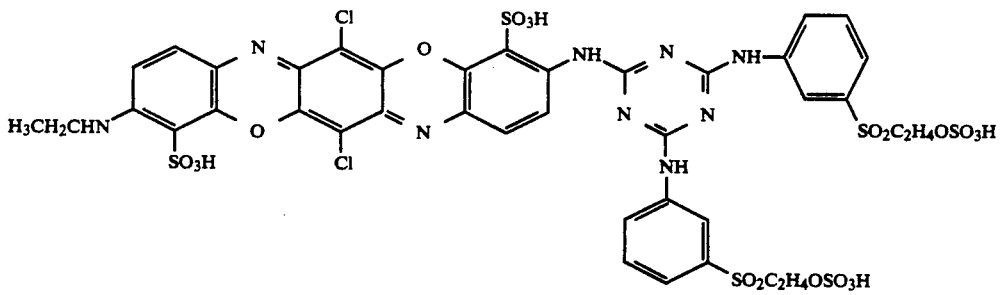

(λmax 590 nm)

particularly chlorine fastness were obtained.

EXAMPLES 351 TO 362

Using the amine compounds described below in place of the 2-aminoethyl-5-aminobenzenesulfonic acid used in Example 331, Example 331 was repeated to obtain the corresponding asymmetric dioxazine compounds.

| Exp. No. | Amine compound |
|---|---|
| 351 | $H_2N$—⟨benzene-$SO_3H$⟩—$NHCH_2SO_3H$ |
| 352 | $H_2N$—⟨benzene-$SO_3H$⟩—$NHC_2H_4OSO_3H$ |
| 353 | $H_2N$—⟨benzene-$SO_3H$⟩—$NHC_3H_6OSO_3H$ |
| 354 | $H_2N$—⟨benzene-$SO_3H$⟩—$NHCH_2OSO_3H$ |
| 355 | $H_2N$—⟨benzene-$SO_3H$⟩—$NHC_2H_4SO_3H$ |
| 356 | $H_2N$—⟨benzene-$SO_3H$⟩—$NHC_3H_6SO_3H$ |
| 357 | $H_2N$—⟨benzene-$SO_3H$⟩—$NHCH_2OCOOH$ |
| 358 | $H_2N$—⟨benzene-$SO_3H$⟩—$NHC_2H_4OCOOH$ |
| 359 | $H_2N$—⟨benzene-$SO_3H$⟩—$NHC_3H_6OCOOH$ |
| 360 | $H_2N$—⟨benzene-$SO_3H$⟩—$NHCH_2COOH$ |
| 361 | $H_2N$—⟨benzene-$SO_3H$⟩—$NHC_2H_4COOH$ |
| 362 | $H_2N$—⟨benzene-$SO_3H$⟩—$NHC_3H_6COOH$ |

EXAMPLE 363

Example 318 was repeated, except that aniline-2,5-disulfonic acid was used in place of the sulfanilic acid used therein. The asymmetric dioxazine compound obtained was subjected to sulfomethylation in a usual manner. The product obtained was found to be the same as the asymmetric dioxazine compound obtained in Example 351.

EXAMPLE 364

Using aniline-2,5-disulfonic acid in place of the sulfanilic acid used in Example 318, Example 318 was repeated to prepare a corresponding intermediate dioxazine compound. The intermediate was subjected to hydroxyethylation using ethylene oxide, followed by sulfuric acid-esterification in a conventional manner. The product obtained was found to be the same as the asymmetric dioxazine compound obtained in Example 352.

EXAMPLE 365

Example 318 was repeated, except that aniline-2,5-disulfonic acid was used in place of the sulfanilic acid used therein. The corresponding asymmetric dioxazine compound obtained was subjected to methylolation in a usual manner, followed by esterification with sulfuric acid. The product obtained was found to be the same as the asymmetric dioxazine compound obtained in Example 354.

EXAMPLE 366

Each of Examples 351 to 362 were repeated, except that amine compounds (1) to (16) described in Example 319 were used in place of the aniline-2,5-disulfonic acid used therein, thereby obtaining corresponding asymmetric dioxazine compounds.

EXAMPLE 367

Each of Examples 351 to 362 were repeated, except that amines (1) to (16) described in Example 320 were used in place of the 1-aminobenzene-3-$\beta$-sulfatoethylsulfone used therein, thereby obtaining corresponding asymmetric dioxazine compounds.

EXAMPLE 368

Each of Examples 315 to 362 were repeated, except that bromanil was used in place of the chloranil used therein in amounts equimolar thereto, thereby obtaining corresponding asymmetric dioxazine compounds.

EXAMPLE 369

Each of the asymmetric dioxazine compounds obtained in Examples 351 to 362 and Examples 366 to 368 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of a blue color superior in fastness properties, particularly chlorine fastness. The dioxazine compounds were also found to be superior in build-up properties.

EXAMPLE 370

The asymmetric dioxazine compound which had been prepared in Example 322 was subjected to sulfomethylation in a usual manner, thereby obtaining an asymmetric dioxazine compound of the following formula in the free acid form.

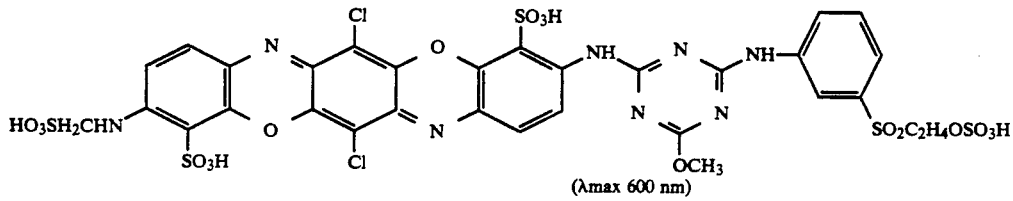

(λmax 600 nm)

EXAMPLE 371

Using 2-ethoxy-4,6-dichloro-s-triazine in place of the 2-methoxy-4,6-dichloro-s-triazine used in Example 322, the procedure of any of Examples 322 and 370 was repeated to obtain corresponding sulfomethylated asymmetric dioxazine compounds.

EXAMPLE 372

Using amines (1) to (16) described in Example 320 in place of the 1-aminobenzene-3-β-sulfatoethylsulfone used in Example 322, procedure of any of Examples 322 and 370 were repeated to obtain a corresponding sulfomethylated asymmetric dioxazine compounds.

EXAMPLE 373

The asymmetric dioxazine compound which had been prepared in Example 325 was subjected to sulfomethylation in a usual manner, thereby obtaining an asymmetric dioxazine compound of the following formula in the free acid form.

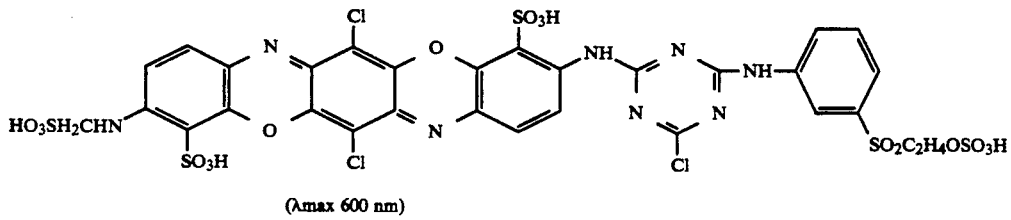

(λmax 600 nm)

EXAMPLE 374

Using amines (1) to (16) described in Example 320 in place of the 1-aminobenzene-3-β-sulfatoethylsulfone used in Example 325, the procedure of any of Examples 325 and 373 were repeated to produce corresponding sulfomethylated asymmetric dioxazine compounds.

EXAMPLE 375

The asymmetric dioxazine compound (103.2 parts) which had been prepared in Example 373 was dissolved in water (1500 parts), and 1-aminobenzene-3-β-sulfatoethylsulfone (28.1 parts) was added to the solution. The reaction was continued at 40° to 90° C. while keeping the pH within a range of 2 to 6 with aqueous sodium carbonate solution, thereby obtaining an asymmetric dioxazine compound of the following formula in the free acid form.

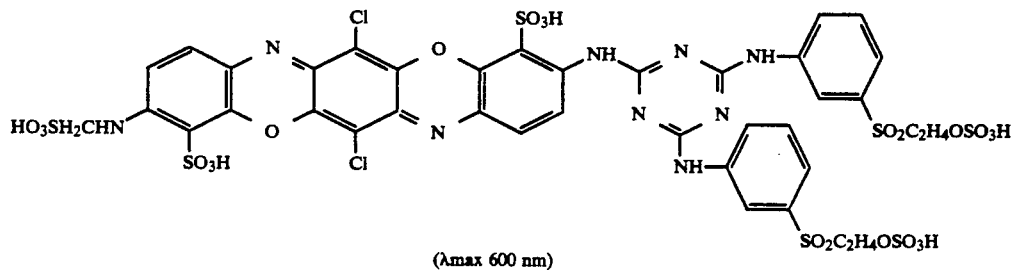

(λmax 600 nm)

EXAMPLE 376

Example 375 was repeated, except that amines (1) to (16) described in Example 320 were used in place of the 1-aminobenzene-3-β-sulfatoethylsulfone used in Example 375, thereby obtaining corresponding asymmetric dioxazine compounds.

EXAMPLE 377

The asymmetric dioxazine compound which had been prepared in Example 327 was subjected to sulfomethylation in a usual manner. The product obtained was found to be the same as the asymmetric dioxazine compound obtained in Example 375.

EXAMPLE 378

Each of the asymmetric dioxazine compounds obtained in Examples 370 to 376 (each of 0.1, 0.3 and 0.6 parts) were dissolved in water (200 parts), and sodium sulfate (10 parts) and cotton (10 parts) were added thereto. The baths were heated to 60° C. and then sodium carbonate (4 parts) was added thereto. Thereafter, dyeing was continued for 1 hour at 60° C. The cotton taken out was washed with water, soaped, again washed with water and then dried to obtain dyed products of blue color superior in fastness properties, particularly chlorine fastness. The dioxazine compounds also were found to be superior in build-up properties.

EXAMPLE 379

Using the asymmetric dioxazine compounds used in Examples 369 and 378, color pastes having the following composition were prepared.

| | |
|---|---|
| Asymmetric dioxazine compound | 5 parts |
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloths were printed with the color pastes having the above composition, pre-dried and steamed at 100° C. for 5 minutes. The treated cloths were washed with hot water, soaped, again washed with hot water and then dried. Thus, printed products of a blue color excellent in fastness properties, particularly chlorine fastness were obtained.

We claim:

1. A compound represented by the following formula in the free acid form,

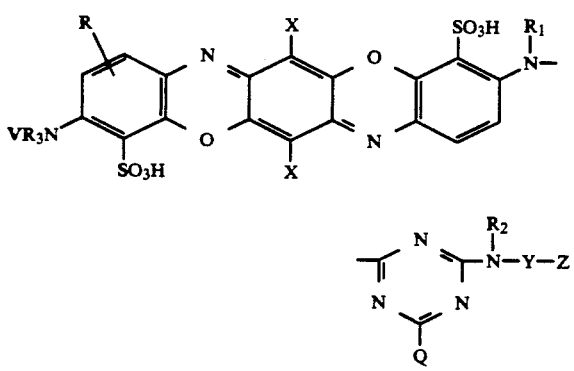

wherein R is halogen, sulfo or $C_1$ to $C_4$ alkoxy;

$R_1$, $R_2$ and $R_3$ independently of one another are each hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl;

$X_1$ and $X_2$ independently of one another are each hydrogen, halogen, alkyl, alkoxy or phenoxy;

Y is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo;

Z' is a group capable of being split by the action of an alkali;

V is hydrogen, alkyl which is unsubstituted or substituted by hydroxy, sulfo, sulfato, hydroxycarbonyloxy or carboxy, or an acyl group of formula (1), $$-W-R_4 \qquad (1)$$

in which W is carbonyl or sulfonyl, and $R_4$ is alkyl which is unsubstituted or substituted by carboxy or sulfo, or phenyl which is unsubstituted or substituted by carboxy or sulfo; and Q is halogen, alkoxy, amino which is unsubstituted or substituted by alkyl, cycloalkyl, aralkyl, aryl or a heterocyclic ring selected from the group consisting of furan, thiophene, pyrazole, pyridine, pyrimidine, quinoline, benzimidazole, benzothiazole and benzoxazole, or a N-heterocyclic ring-constituting amino selected from the group consisting of morpholino, piperidino and piperazino, said alkyl, cycloalkyl, aralkyl, aryl, heterocyclic ring and N-heterocyclic ring-constituting amino each being unsubstituted or substituted by halogen, nitro, cyano, trifluoromethyl, sulfamoyl, carbamoyl, $C_1$ to $C_4$ alkyl, $C_1$ to $C_4$ alkoxy, ureido, hydroxy, carboxy, sulfomethyl or sulfo, or a group of formula (3), $$-\underset{\underset{R_5}{|}}{N}-Y_1-Z_1 \qquad (3)$$

in which $R_5$ is hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl, $Y_1$ is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo, and $Z_1$ is $-SO_2CH=CH_2$ or $-SO_2CH_2CH_2Z''$ in which $Z''$ is a group capable of being split by the action of an alkali.

2. The compound according to claim 1, wherein $R_1$ is hydrogen.

3. The compound according to claim 1, wherein both $X_1$ and $X_2$ are chlorine or bromine.

4. The compound according to claim 1, wherein Y is phenylene unsubstituted or substituted once or twice by methyl, ethyl, methoxy, ethoxy, chlorine, bromine, nitro, sulfo or carboxy, or naphthylene unsubstituted or substituted by sulfo.

5. The compound according to claim 1, wherein R is sulfo.

6. A compound represented by the following formula in the free acid form,

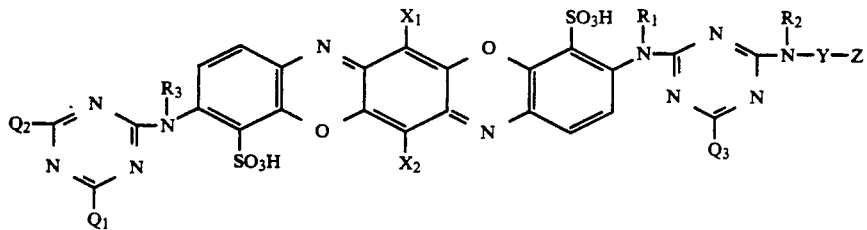

wherein $R_1$, $R_2$ and $R_3$ independently of one another are each hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl;

- $X_1$ and $X_2$ independently of one another are each hydrogen, halogen, alkyl, alkoxy or phenoxy;
- Y is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo;
- Z is $-SO_2CH=CH_2$ or $-SO_2CH_2CH_2Z'$ in which $Z'$ is a group capable of being split by the action of an alkali;
- $Q_1$ and $Q_2$ independently of one another are each amino which is unsubstituted or substituted by alkyl, cycloalkyl, aralkyl, aryl or a heterocyclic ring selected from the group consisting of furan, thiophene, pyrazole, pyridine, pyrimidine, quinoline, benzimidazole, benzothiazole and benzoxazole, or an N-heterocyclic ring-constituting amino selected from the group consisting of morpholino, piperidino and piperazino, said alkyl, cycloalkyl, aralkyl, aryl, heterocyclic ring and N-heterocyclic ring-constituting amino each being unsubstituted or substituted by halogen, nitro, cyano, trifluoromethyl, sulfamoyl, carbamoyl, $C_1$ to $C_4$ alkyl, $C_1$ to $C_4$ alkoxy, ureido, hydroxy, carboxy, sulfomethyl or sulfo; and
- $Q_3$ is amino which is unsubstituted or substituted by alkyl, cycloalkyl, aralkyl, aryl or a heterocyclic ring selected from the group consisting of furan, thiophene, pyrazole, pyridine, pyrimidine, quinoline, benzimidazole, benzothiazole and benzoxazole, or an N-heterocyclic ring-constituting amino selected from the group consisting of morpholino, piperidino and piperazino, said alkyl, cycloalkyl, aralkyl, aryl, heterocyclic ring and N-heterocyclic ring-constituting amino each being unsubstituted or substituted by halogen, nitro, cyano, trifluoromethyl, sulfamoyl, carbamoyl, $C_1$ to $C_4$ alkyl, $C_1$ to $C_4$ alkoxy, ureido, hydroxy, carboxy, sulfomethyl or sulfo or a group of formula (3),

in which $R_5$ is hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl, $Y_1$ is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo, and $Z_1$ is $-SO_2CH=CH_2$ or $-SO_2CH_2CH_2Z''$ in which $Z''$ is a group capable of being split by the action of an alkali.

7. The compound according to claim 6, wherein both $R_1$ and $R_3$ are hydrogen.

8. A compound represented by the following formula in the free acid form,

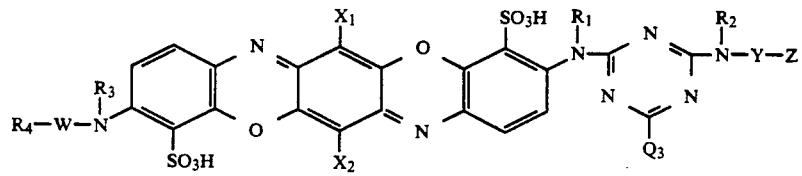

wherein $R_1$, $R_2$ and $R_3$ independently of one another are each hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl;

- $X_1$ and $X_2$ independently of one another are each hydrogen, halogen, alkyl, alkoxy or phenoxy;
- Y is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo;
- Z is $-SO_2CH=CH_2$ or $-SO_2CH_2CH_2Z'$ in which $Z'$ is a group capable of being split by the action of an alkali;
- W is carbonyl or sulfonyl;
- $R_4$ is alkyl which is unsubstituted or substituted by carboxy or sulfo, or phenyl which is unsubstituted or substituted by carboxy or sulfo; and
- $Q_3$ is amino which is unsubstituted or substituted by alkyl, cycloalkyl, aralkyl, aryl or a heterocyclic ring selected from the group consisting of furan, thiophene, pyrazole, pyridine, pyrimidine, quinoline, benzimidazole, benzothiazole and benzoxazole, or an N-heterocyclic ring-constituting amino selected from the group consisting of morpholino, piperidino and piperazino, said alkyl, cycloalkyl, aralkyl, aryl, heterocyclic ring and N-heterocyclic ring-constituting amino each being unsubstituted or substituted by halogen, nitro, cyano, trifluoromethyl, sulfamoyl, carbamoyl, $C_1$ to $C_4$ alkyl, $C_1$ to $C_4$ alkoxy, ureido, hydroxy, carboxy, sulfomethyl or sulfo, or a group of formula (3),

in which $R_5$ is hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl, $Y_1$ is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo, and $Z_1$ is $-SO_2CH=CH_2$ or $-SO_2CH_2CH_2Z''$ in which $Z''$ is a group capable of being split by the action of an alkali.

9. The compound according to claim 8, wherein both $R_1$ and $R_3$ are hydrogen.

10. A compound represented by the following formula in the free acid form,

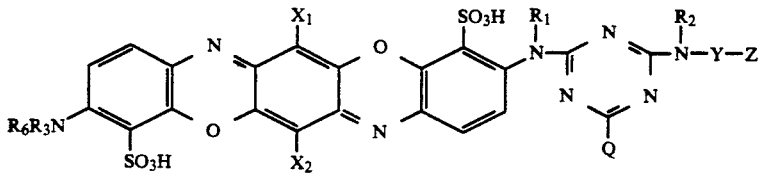

wherein $R_1$, $R_2$ and $R_3$ independently of one another are each hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl;

$X_1$ and $X_2$ independently of one another are each hydrogen, halogen, alkyl, alkoxy or phenoxy;

Y is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo;

Z' is a group capable of being split by the action of an alkali;

Q is halogen, alkoxy, amino which is unsubstituted or substituted by alkyl, cycloalkyl, aralkyl, aryl or a heterocyclic ring selected from the group consisting of furan, thiophene, pyrazole, pyridine, pyrimidine, quinoline, benzimidazole, benzothiazole and benzoxazole, or an N-heterocyclic ring-constituting amino selected from the group consisting of morpholino, piperidino and piperazino, said alkyl, cycloalkyl, aralkyl, aryl, heterocyclic ring and N-heterocyclic ring-constituting amino each being unsubstituted or substituted by halogen, nitro, cyano, trifluoromethyl, sulfamoyl, carbamoyl, $C_1$ to $C_4$ alkyl, $C_1$ to $C_4$ alkoxy, ureido, hydroxy, carboxy, sulfomethyl or sulfo, or a group of formula (3),

in which $R_5$ is hydrogen or $C_1$ to $C_4$ alkyl which is unsubstituted or substituted by hydroxy, cyano, $C_1$ to $C_4$ alkoxy, halogen, carbamoyl, carboxy, $C_1$ to $C_4$ alkoxycarbonyl, $C_1$ to $C_4$ alkylcarbonyloxy, sulfo or sulfamoyl, $Y_1$ is $-(CH_2)_2-$, $-(CH_2)_3-$, $-(CH_2)_2O-(CH_2)_2-$, phenylene which is unsubstituted or substituted once or twice by methyl, ethyl, methoxy, ethoxy, chlorine, bromine, nitro, carboxy or sulfo, or naphthylene which is unsubstituted or substituted once by sulfo, and $Z_1$ is $-SO_2CH=CH_2$ or $-SO_2CH_2CH_2Z''$ in which $Z''$ is a group capable of being split by the action of an alkali; and $R_6$ is $C_1$ to $C_4$ sulfoalkyl.

11. The compound according to claim 6, wherein $R_1$ is hydrogen.

12. The compound according to claim 6, wherein both $X_1$ and $X_2$ are chlorine or bromine.

13. The compound according to claim 6, wherein Y is phenylene which is unsubstituted or substituted once or twice by methyl, ethyl, methoxy, ethoxy, chlorine, bromine, nitro, sulfo or carboxy, or naphthylene unsubstituted or substituted by sulfo.

14. The compound according to claim 8, wherein $R_1$ is hydrogen.

15. The compound according to claim 8, wherein both $X_1$ and $X_2$ are chlorine or bromine.

16. The compound according to claim 8, wherein Y is phenylene which is unsubstituted or substituted once or twice by methyl, ethyl, methoxy, ethoxy, chlorine, bromine, nitro, sulfo or carboxy, or naphthylene unsubstituted or substituted by sulfo.

17. The compound according to claim 10, wherein $R_1$ is hydrogen.

18. The compound according to claim 10, wherein both $X_1$ and $X_2$ are chlorine or bromine.

19. The compound according to claim 10, wherein Y is phenylene which is unsubstituted or substituted once or twice by methyl, ethyl, methoxy, ethoxy, chlorine, bromine, nitro, sulfo or carboxy, or naphthylene unsubstituted or substituted by sulfo.

* * * * *